United States Patent
Liu et al.

(10) Patent No.: US 10,326,145 B2
(45) Date of Patent: *Jun. 18, 2019

(54) SYNTHESIS OF ELECTROCATALYSTS USING METAL-ORGANIC FRAMEWORK MATERIALS

(75) Inventors: Di-Jia Liu, Elmhurst, IL (US); Dan Zhao, DeKalb, IL (US)

(73) Assignee: UChicago Argonne, LLC, Chicago, IL (US)

(*) Notice: Subject to any disclaimer, the term of this patent is extended or adjusted under 35 U.S.C. 154(b) by 1650 days.

This patent is subject to a terminal disclaimer.

(21) Appl. No.: 13/444,550

(22) Filed: Apr. 11, 2012

(65) Prior Publication Data

US 2013/0273461 A1    Oct. 17, 2013

(51) Int. Cl.
| | |
|---|---|
| B01J 31/22 | (2006.01) |
| H01M 8/00 | (2016.01) |
| H01M 4/90 | (2006.01) |
| B01J 31/16 | (2006.01) |
| B01J 31/18 | (2006.01) |
| H01M 8/1018 | (2016.01) |

(52) U.S. Cl.
CPC ........ H01M 4/9008 (2013.01); B01J 31/1691 (2013.01); B01J 31/181 (2013.01); B01J 2531/842 (2013.01); H01M 2008/1095 (2013.01)

(58) Field of Classification Search
CPC .................................................. H01M 4/9008
See application file for complete search history.

(56) References Cited

U.S. PATENT DOCUMENTS

2011/0294658 A1* 12/2011 Lefevre .................... B01J 21/18
502/185

OTHER PUBLICATIONS

Park ( Exceptional Chemical and Thermal stability of Zeolitic imidazolate frameworks, PNAS, 2006, 103: 10186-10191).*
Janiak (MOFs, MILs and more: concepts, properties and applications for porous coordination networks (PCNs), New, J. Chem., 2010, 34:2366-2388).*
Jaouen et al, Heat-Treated Fe/N/C catalysts for O2 Electroreduction: Are Active Sites Hosted in Micropores? J. Pys. Chem. B, 2006,110, 5553-5558.*
Van Veen, et al., Oxygen Reduction on Monomeric Transition Metal Phthalocyanines in Acid Electrolyte, Electrochimica Acta, Apr. 1979, pp. 921-928, vol. 24, Pergamon Press Ltd., Great Britain.
Ma, et al., cobalt Imidazolate Framework as Precursor for Oxygen Reduction Reaction Electrocatalysts, Communication, 2011, pp. 2063-2067, vol. 17, Wiley-VCH Verlag GmbH & Co. KGaA, Weinheim.

(Continued)

*Primary Examiner* — Jun Li

(74) *Attorney, Agent, or Firm* — Foley & Lardner LLP

(57) ABSTRACT

Methods and compositions for use in the preparation of MOF-based non-PGM electrocatalysts including combining transition metal compounds with organic ligands and secondary building units to create a solid mixture, heating the solid mixture to form a MOF through a solid-state reaction, optionally heating the MOF to convert it to an electrocatalyst via pyrolysis, and optionally post-treating. The electrode catalysts may be used in various electrochemical systems, including a proton exchange membrane fuel cell.

21 Claims, 26 Drawing Sheets

(56) References Cited

OTHER PUBLICATIONS

Lin, et al., Solvent/Additive-Free Synthesis of Porous/Zeolitic Metal Azolate Frameworks from Metal Oxide Hydroxide, Chem. Comm., May 2011, pp. 9185-9187, vol. 47, The Royal Society of Chemistry.
Lefevre, et al., Fe-Based Catalysts for the Reduction of Oxygen in Polymer Electrolyte membrane Fuel Cell Conditions: Determination of the Amount of Peroxide Released During Electroreduction and its Influence on the Stability of the Catalysts, Electrochimica Acta, Feb. 2003, pp. 2749-2760, vol. 48, Elsevier Science Ltd.
Jasinski, A New Fuel Cell Cathode Catalyst, Nature, Mar. 1964, pp. 1212-1213, vol. 201, Nature Publishing Group.
Cote, et al., Activation and Characterization of Fe-Based Catalysts for the Reduction of Oxygen in Polymer Electrolyte Fuel Cells, Electrochimica Acta., 1998, pp. 1969-1984, vol. 43, Nos. 14-15 Elsevier Science Ltd., Great Britain.
Lefevre, et al., Iron-Based Catalysts with Improved Oxygen Reduction Activity in Polymer Electrolyte Fuel Cells, Science, Apr. 2009, pp. 71-74, vol. 324, American Association for the Advancement of Science, Washington, D.C.
Proietti, et al., Iron-Based Cathode Catalyst with Enhanced Power Density in Polymer Electrolyte Membrane Fuel Cells, Nature Communications, Mar. 2011, pp. 1-9, Macmillan Publishers Ltd.
Wu, et al., High-Performance Electrocatalysts for Oxygen Reduction Derived from Polyaniline, Iron, and Cobalt, Science, Apr. 2011, pp. 443-447, vol. 332, American Association for the Advancement of Science, Washington, D.C.

\* cited by examiner

SYNTHESIS OF ELECTROCATALYSTS USING METAL-ORGANIC FRAMEWORK MATERIALS

GOVERNMENT INTEREST

The United States Government has rights in this invention pursuant to Contract No. DE-AC02-06CH11357 between the United States Government and the UChicago Argonne, LLC, representing Argonne National Laboratory.

FIELD OF THE INVENTION

This invention pertains to electrocatalysts for use in fuel cells. More specifically this invention relates to electrocatalysts for use in fuel cells which do not contain platinum or other platinum group metals and methods of preparing such electrocatalysts using metal-organic framework materials.

BACKGROUND

This section is intended to provide a background or context to the invention that is, inter alia, recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A fuel cell is an effective device for converting chemical energy to electrical energy through electro-catalytic reactions. The proton exchange membrane fuel cell (PEMFC) operates at a relatively low temperature with the gas phase hydrogen as fuel and oxygen (air) as oxidant. Because of its relatively high conversion efficiency, low noise and low emissions, the PEMFC is deemed to have substantial potential for use in a variety of applications, including automobiles and distributed power generation. At the core of a PEMFC is the membrane electrode assembly (MEA) which includes an anode, a cathode, and a polymer electrolyte layer in between. At the surface of the anode, hydrogen is oxidized to protons through the electro-catalytic process

$$H_2 \rightarrow 2H^+ + 2e^- \quad (1)$$

The protons thus produced are transported to the cathode side through the proton conductive polymer electrolyte layer. At the surface of the cathode, oxygen is electro-catalytically reduced and subsequently reacts with protons from equation (1) to form water:

$$O_2 + 4e^- + 4H^+ \rightarrow 2H_2O \quad (2)$$

Reaction (2) is also known as the oxygen reduction reaction (ORR). Reactions (1) and (2) occur on the surface of the electrode catalysts. At present, generally the most effective catalyst for electrocatalytic reactions utilizes a platinum (Pt) electrode catalyst supported on an amorphous carbon substrate. A typical Pt loading on the MEA surface ranges from about 0.2 mg/cm² to about 0.4 mg/cm². Because platinum is a precious metal with limited supply, its use as a catalyst adds a significant cost to a PEMFC system. Other platinum group metals (PGMs), such as Pd, Rh, Ru, etc., are being evaluated as a possible replacement for Pt. However, PGMs also generally suffer from high cost and limited reserves. As such, the use of PGMs in electrochemical devices such as a fuel cell typically adds significant cost to the system and represents a major barrier to commercialization.

Various attempts have been made to replace PGMs in fuel cells. These attempts have been mainly focused on developing replacement materials utilizing transition metal compounds. For example, it is known that molecules containing a macrocyclic structure with an iron or cobalt ion coordinated by nitrogen from the four surrounding pyrrolic rings has catalytic activity toward capture and reduction of molecular oxygen. Additionally, ORR catalytic activity can be improved for systems containing coordinated $FeN_4$ and $CoN_4$ macrocycles through heat treatment. Examples of a macro-molecular system containing $FeN_4$ and $CoN_4$ moieties include corresponding transitional metal phthalocyanine and porphyrin.

Methods of preparing non-PGM catalyst by incorporating a transition metal into heteroatomic polymers in a polymer/carbon composite are also known. Additionally, good ORR activity can be achieved by mixing amorphous carbon based catalyst with $FeN_4$ group and carbonaceous material or synthetic carbon support, followed by high temperature treatment in a gas mixture of ammonia, hydrogen and argon. An iron salt adsorbed on carbon in the presence of a nitrogen precursor can also produce a catalyst with good ORR activity. However, such catalyst material will generally decompose under acidic conditions to release iron, and thus is unstable for the electro-catalytic reaction within a fuel cell cathode. Additionally, because carbon does not carry the electrocatalytic activity by itself, using a carbon support dilutes the catalytic active site and results in inhomogeneous active site distribution in the final catalyst materials thus prepared.

Furthermore, other new methods of preparing the electrode catalysts for the ORR have been disclosed, such as those containing mainly transition metals, carbon and nitrogen, but free of PGMs. Such a method may include multiple steps such as (1) the synthesis of metal-organic framework (MOF) materials containing transition metals and organic ligands with or without nitrogen-containing functional groups through solvothermal reaction in solvent, (2) optionally adding another one or more transition metals into the porous structure of the MOF materials through addition in solvent, (3) optionally adding other nitrogen containing compounds into the MOF through solvent exchange, (4) Separate prepared MOF from solvent and heat-treating the MOF materials at the elevated temperatures under inert gas atmosphere, (5) optionally further heat-treat the prepared MOFs at the elevated temperature in the presence of ammonia or other N-containing chemicals, (6) optionally further treat the prepared materials with acids to remove excess metals, (7) optionally further treat the prepared material under inert gas atmosphere at elevated temperature. For a complete description, see U.S. Pub. No. 2012-0077667, which is herein incorporated by reference in its entirety.

However, although MOF materials have been demonstrated to be an effective precursor for preparing a non-PGM catalyst, the synthesis process is often costly. The MOF synthesis generally requires solvothermal reaction in solution phase for an extended period of time. Such a use of solvent for synthesis, together with the subsequent separation, adds to both the material and processing costs of MOF preparation.

In light of these considerations, there is a need to develop a low cost synthesis route to prepare non-PGM catalysts with improved catalytic activity in ORR.

SUMMARY

The present invention relates to such methods of preparing electrode catalysts that may be used in an oxygen reduction reaction ORR. The present electrode catalysts contain mainly transition metals, carbon and nitrogen but are free of precious group metals (PGMs). The electrode catalysts prepared according to the present invention have several advantages over various conventional electrocatalyst materials, including a high surface area, high active site density, uniform site distribution, and ease of chemical modification. Additionally, the catalytic activity of the electrocatalyst materials can be further enhanced when heat treated in the presence of various chemicals.

In one aspect, the present invention provides a method for the synthesis of a non-PGM catalyst for use in an ORR process, said method comprising the steps of: combining at least one organic ligand, a first transition metal compound as the secondary building unit (SBU), and a second transition metal compound into a solid mixture substantially solvent-free; and heating the solid mixture to a temperature and for a duration sufficient to form a metal-organic framework (MOF) through a solid-state reaction; wherein the step of combining takes place in a single vessel.

In some embodiments, the method may further comprise the step of converting the MOF to an electro-catalyst via pyrolysis at high temperature. In further embodiments, the method does not comprise the step of separating the MOF from the other components of the reaction. The transition metal may, in some embodiments, be incorporated into the MOF either as part of the framework or as a uniformly distributed additive during the synthesis. Further, the MOF may contain at least two different transition metals. In some embodiments, the step of combining comprises mixing a first transition metal salt or metal oxide with the organic ligand in a desired stoichiometric ratio for the formation of the MOF, and adding a second transition metal salt or complex. In still further embodiments, the step of adding a second transition metal salt or complex may be followed by the step of uniformly mixing the solid mixture through mechanical means prior to subjecting the solid mixture to heat treatment.

In yet further embodiments, the solid-state reaction step and the pyrolysis step may be performed in tandem without a step of cooling in between the solid-state reaction step and the pyrolysis step. The at least one organic ligand may, in some embodiments, comprise a plurality of nitrogen containing ligands selected from the group consisting of: imidazolate, pyrazolate, piperazine, tetrazolate, and combinations thereof. Further, the first transition metal may be in the zinc salt or zinc oxide form. Still further, the second transition metal may be selected from the group consisting of the salt or organometallic complex form of iron, cobalt, copper, or nickel. The method may, in some embodiments, further comprise the step of processing the MOF to further enhance catalytic activity, said processing comprising acid wash, ball milling, and/or thermal treatment in inert gas or in the presence of ammonia. The electro-catalysts made by these methods may, in some embodiments, be incorporated into a membrane electrode assembly of a proton exchange membrane fuel cell.

In another aspect, a composition is provided for use in the synthesis of a non-PGM catalyst, said composition comprising at least two transition metal compounds and at least one organic ligand compound. The at least one organic ligand may, in some embodiments, comprises a plurality of nitrogen containing ligands selected from the group consisting of: imidazolate, pyrazolate, piperazine, tetrazolate, and combinations thereof. In further embodiments, the first transition metal may be in the zinc salt or zinc oxide form. In still further embodiments, the second transitional metal may be selected from the group consisting of the salt or organometallic complex form of iron, cobalt, copper, or nickel. Additionally, the molecular ratio between the first transition metal compound to the organic ligand is stoichiometrically equivalent to that in the MOF framework, and the concentration of the second transition metal compound is independent. In other embodiments, the molecular ratio of the sum of first and second transition metals to the organic ligand may be stoichiometrically equivalent to that for the formation of mixed MOF frameworks.

In still another aspect, a non-PGM catalyst is provided for use in an ORR process, the catalyst comprising: a metal-organic framework comprising: at least one transition metal; at least one organic ligand; and at least another transition metal compound serving as the secondary building unit; wherein the metal-organic framework is formed in a reaction that is substantially solvent-free.

These and other objects, advantages, and features of the invention, together with the organization and manner of operation therefore, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
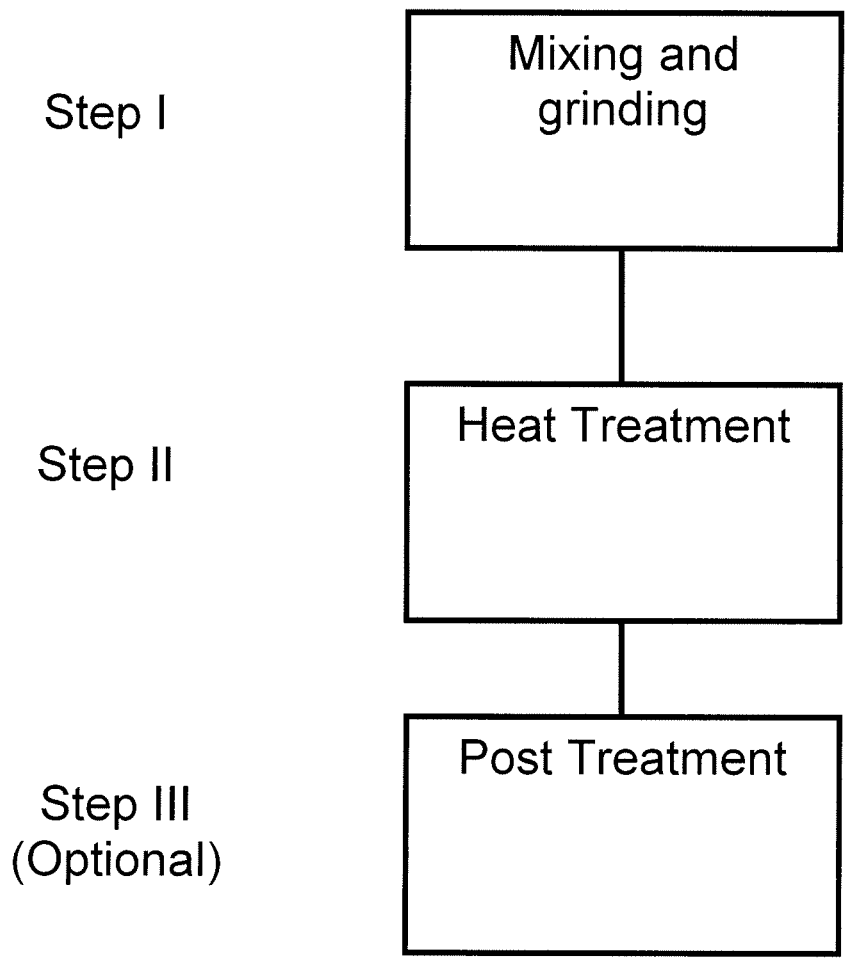
FIG. 1 is a schematic depicting a one-pot process flow for preparing non-PGM catalyst using metal organic framework materials as a precursor in accordance with an embodiment of the present invention.

The presently-claimed process is versatile for many MOF systems, especially for those belong to zeolithic imidazole framework (ZIF) materials. The transition metal serving as the active ingredient for ORR catalyst is also incorporated into the MOF either as part of the framework or as additive during the same one-pot MOF formation process. No additional step is necessary to add the transition metal. Furthermore, no cooling step is necessary between the formation of MOF at lower temperature and thermolysis at higher temperature therefore substantial energy saving can be realized.

According to various embodiments, non-PGM electrode catalysts are prepared using thermally treated transition metal-organic framework materials (MOFs). The prepared catalyst materials are characterized by various advantages applicable to electro-catalytic reactions, including a proton exchange membrane fuel cell (PEMFC) and in particular the electrodes of the membrane electrode assembly (MEA). At the core of a PEMFC is the MEA, which comprises an anode, a cathode and a polymer electrolyte layer in between. At the surface of the anode, hydrogen is oxidized through the electrocatalytic process described by Equation 1. The protons thus produced are transported to the cathode side through the proton conductive membrane. At the surface of the cathode, oxygen is electro-catalytically reduced and subsequently reacts with protons from the Equation (1) to form water.

MOF materials may be prepared according to the present invention using non-PGM transition metals that can serve as the catalytic centers. The applicable transition metals include Co, Fe, Ni, Cr, Cu, Mn, Ta, W, etc. Organic ligands are also utilized by converting the ligands as part of the catalyst structure through a thermal treatment process. In various embodiments, the organic ligands contain nitrogen within their molecular structure and include imidazolate, pyrazolate, tetrazolate, etc. Optionally, non-nitrogen containing organic ligands can also be used in synthesis of MOF materials that may be used as a precursor for electrocatalyst preparation.

Cathodic ORR, such as that described by the Equation 2, typically occurs at the surface of platinum in the electrocatalyst. Molecular oxygen is first adsorbed on the Pt active site and is subsequently converted to the water by capturing four electrons and reacting with four protons. Few catalyst metals were found to have a comparable catalytic efficiency to that of platinum for the ORR. Those found with similar catalytic activity usually belongs to PGMs, such as Pd, Rh, Ir, Ru, etc., in addition to Pt. The PGMs are generally a high cost material due to limited reserve worldwide. The use of PGMs to the electrochemical device such as fuel cell will add significant cost to the system therefore creating major barrier for commercialization. It is highly desirable to find low cost alternatives to PGMs as the electrode catalyst for fuel cell and similar electrocatalytic application.

The details on one embodiment of a "one-pot" synthesis approach of preparing MOF based non-PGM catalyst can be described by the process flow chart in FIG. 1. It consists of the following steps; I) chemical mixing—mixing zinc oxide (ZnO), organic ligands and transition metal (TM) organometallic compound or salt uniformly, usually through mechanical means for solid blending such as grinding, ball-milling, etc., to produce a uniform mixture, generally in the form of solid; II) heat treatment—the solid mixture produced in the step I will be heated to be converted to the electrode catalyst.

The heat treatment can be a two-step or a one-step process. In the two-step process, the mixture is first heated to a lower temperature near the melting point of the organic ligand, so that the ligand will be converted to the liquid state with intimate interaction with ZnO and TM complex. Simultaneously, the crystallization process will occur during this step where the organic ligand reacts with ZnO to form MOF. TM organometallic complex will either be incorporated inside in the MOF cage structure or react with the ligand to be part of the MOF crystallite structure. Such heat treatment is usually conducted in an inert gas environment for an extended period time to ensure sufficient time for crystallite growth. Following low temperature heat treatment, the TM-containing MOFs thus produced will subject to a second heat treatment where the organic components in MOF will be converted to carbonaceous materials so that electroconductivity of the sample will be greatly enhanced. The second heat treatment is typically carried out above the carbonization temperature for the organics in an inert atmosphere. In addition to organics-to-carbon conversion, zinc will also be released from the product through vaporization, leaving the carbonized material with high porosity.

Alternatively, the heat-treatment can be performed in one-step process. In the one-step process, the solid mixture prepared from Step I will be heated at pre-designated ramping rate under the inert gas environment. During the heating process, the MOF microcrystallites will be first formed through the solid state reaction between ZnO, TM complex with organic ligand before being converted to carbonaceous electrode catalyst materials. The main difference between the one- and two-step processes is the size of MOF crystallite as the intermediate and the catalyst as the end product.

III) Post treatment—the electrode catalyst produced through step II can be subjected to an optional post treatment to further enhance the catalyst activity. The post treatment includes further modification of composition or morphology by chemical or physical means. For example, the acid wash can be applied to the materials from step II to remove metallic TM or Zn produced through heat treatment. A third heat treatment can be applied in the presence of nitrogen-containing gas, such as $NH_3$ to further enhance nitrogen content in the catalyst. Not limited by the scientific hypothesis, such treatments can increase the catalytic site density leading to better electro-catalytic activity.

Step I—Mixing Chemicals

Figure 2:
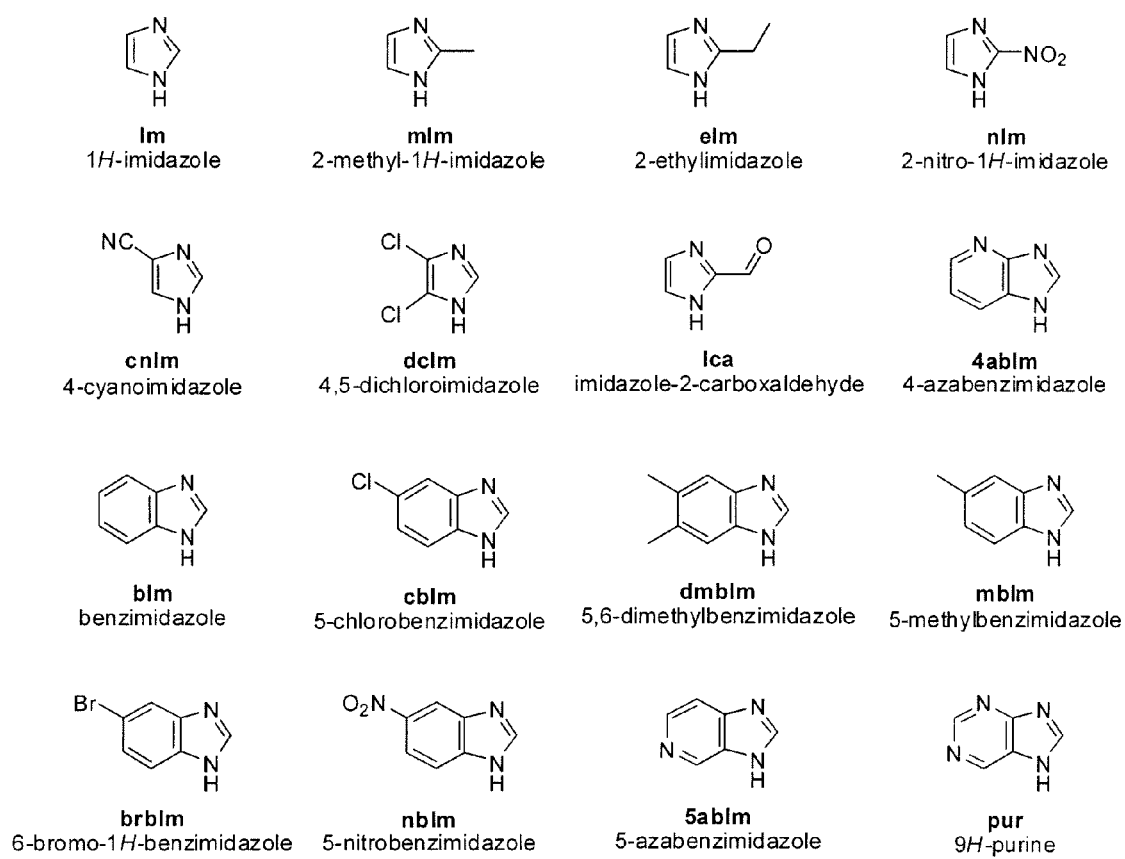
FIG. 2 is a schematic of molecular structures of selected imidazolate ligands for the preparation of transition metal containing metal organic framework materials according to the process of FIG. 1.
Figure 3:
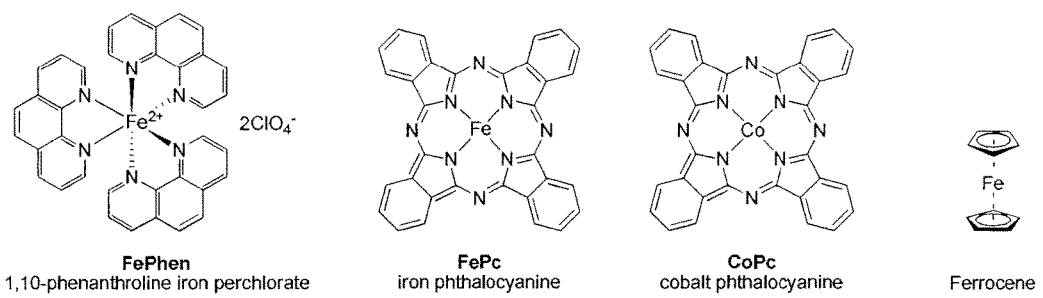
FIG. 3 is a schematic of molecular structures of selected transition metal containing organometallic compounds.

In one embodiment, there are three key components in synthesis of TM-containing MOF via solid state reaction: a secondary building unit node, an organic ligand, and a TM compound. The secondary building unit is ZnO which serves as the node in the construction of the framework. ZnO is usually acquired from the commercial source. The second component is the organic ligand which serves as the linker connecting the node in the MOF. The linkers in the current invention include a wide variety of organic compounds. In the preferred embodiment, the ligands include the multidentate organic compounds containing imidazole functional group. In a more preferred embodiment, the ligands include 1H-imidazole (Im), 2-methyl-1H-imidazole (mIm), 2-ethyl-imidazole (eIm), 4,5-dichloroimidazole (dcIm), 4-azabenz-imidazole (4abIm), etc. The molecular structures of some representative organic ligands are given in FIG. 2. The third component is the TM-containing organometallic compound or metal salt which can be encapsulated inside of the MOF. Alternatively, the metal from the organometallics or the salt can be integrated into a mixed MOF, becoming a portion of the network of node during the synthesis and generating a sub-structure within the main structure of the MOF. The TM organometallics or salts include compounds containing transition metal from the selection of Fe, Co, Ni, Cu, Ti, etc. In the preferred embodiment, the TM organometallics and salts include 1,10-phenanthroline iron perchlorate, iron phthalocyanine, cobalt phthalocyanine, ferrocene, ammonium iron (II) sulfate hexahydrate, dichlorotetrakis(pyridine)iron, iron (II) bromide, iron(III) bromide, iron(II) chloride, iron(III) chloride, iron(III) citrate, iron(II) fluoride, iron(III) fluoride, iron(II) iodide, iron(II) molybdate, iron(III) nitrate, iron(II) oxalate, iron(III) oxalate, iron(II) perchlorate, iron(III) phosphate, iron(II) sulfate, iron(III) sulfate, iron(II) tetrafluoroborate, potassium hexacyanoferrate(II) trihydrate, iron(II) acetate, etc. The molecular structures of some representative TM organometallic complexes are given in FIG. 3. In a more preferred embodiment, the TM organometallics and salts include 1,10-phenanthroline iron perchlorate (FePhen), iron phthalocyanine (FePc), cobalt phthalocyanine (CoPc), ferrocene. In the mixture, the molecular ratio of ZnO and ligand should be maintained to equal that of stoichiometric Zn to ligand ratio in the corresponding MOF crystal. In one embodiment, the concentration of the TM-organometallics or salt is independent to that of ZnO/ligand ratio. Preferably, the weight percentage of the TM-organometallics or salt is in the range of 1 to 20%. In an alternative embodiment, the concentration of the TM-organometallics or salt is dependent to the ZnO/ligand ratio when the transition metal serves as a portion of the network of node. In these cases, the ratio of total moles of ZnO and transition metal to the moles of ligand should equal to the stoichiometric ratio observed in the mixed MOF. Preferably, the molar percentage of TM-organometallics or salt is in the range of 0.1 to 5%. The zinc oxide, some of the ligands and TM-organometallic compounds are typically in the solid form at ambient temperature. To ensure the maximum contact between all the solids for optimal crystallization, these chemicals need to be mixed uniformly through various methods including grinding, shaking, ball-milling, planetary ball-milling, and other means known to the those of skill in the art.

Step II—Heat Treatment

The heat treatment will convert the solid mixtures prepared in step I) to the electrode catalytic materials. The heat treatment can be accomplished by either a two-step process or a one-step process, depending on the desired catalyst surface property and morphology.

In the two-step process, the chemical mixture produced from Step I will firstly undergo the first heat treatment through which the MOF will be produced through solid-state crystallization reaction. The temperature for the first heat treatment is typically slightly above the melting point of the organic ligand. The temperature should also be sufficiently high to promote reaction kinetics with ZnO. Not limited by the scientific hypothesis, the ligands convert from solid to liquid under such temperature which also facilitates the dissolution of TM-containing organometallics or salt for better encapsulation or reaction during MOF formation. In a preferred embodiment, the temperature should be in the range from 140 to 200° C.

The first heat treatment should be carried out under the inert atmosphere or oxygen-free atmosphere to prevent any negative effect from the oxidation of the organic ligand. In the preferred embodiment, the heat treatment should be carried out under the blanket of argon or nitrogen gas. In another preferred embodiment, the heat treatment should be carried out in a sealed container under vacuum or inert gas. The reaction time also has significant effect on completion of MOF crystallization reaction. The reaction time depends on the type of organic ligand used for the reaction. In a preferred embodiment, the reaction time should be in the range from 2 to 48 hours. In a more preferred embodiment, the reaction time should be in between 6 to 24 hours. The MOF product produced from the first heat treatment can be cooled and stored for the next process. Alternatively, it can proceed to the second heat treatment without cooling step in between. The TM/ZnO MOFs formed after the first heat treatment will be subjected to a second, higher temperature treatment.

The second heat treatment carbonizes the MOF materials during pyrolysis which serves following purposes simultaneously: a) forming active site through the reaction of metal center, organic ligand and optionally the solvent trapped inside of MOF cavities through pyrolysis; and b) improving the electron conductivity of the framework materials by partially carbonize the organic ligands so that the charge can be more effectively transferred to and from the catalytic active site during the electrochemical reaction; c) producing additional porosity and surface area by first reducing zinc to metallic form before vaporizing it from the carbonized sample, leaving behind voids and channels and improved mass transfer. The thermal conversion of the MOF material is conducted in a controlled environment, typically under inert gas such as Ar or $N_2$ flow. In a preferred embodiment, the treatment is carried out inside of a tubular reactor under the constant flow of $N_2$ surrounded by temperature controlled furnace. The thermal conversion temperature typically ranges from 400° C. to 1100° C. In a preferred embodiment, the temperature ranges from 700° C. to 1000° C. In a more preferred embodiment, the temperature ranges from 900° C. to 1000° C. The time sample under the thermal conversion temperature should also be controlled. According to the present embodiment of invention, the thermal treatment time should be controlled between 15 minutes to 3 hours. In the preferred embodiment, the time under the treatment of temperature should be 60 minutes to 90 minutes. After step III), the material is activated as the electrocatalyst.

Alternatively, the heat treatment can be accomplished by a one-step process. In the one-step process, the chemical mixture produced from Step I will be heated at different ramp rates from the ambient to the carbonization temperature without any dwell time at an intermediate temperature. Similar to the two-step process, the heat treatment is carried out under inert atmosphere such as argon or nitrogen. In a preferred embodiment, the heating ramp rate ranges from 1° C./min to 50° C./min. In a more preferred embodiment, the ramp rate ranges from 5° C./min to 20° C./min. The final thermal conversion temperature of the one-step process is similar to that of two-step process, which ranges from 700° C. to 1000° C. in a preferred embodiment and from 900° C. to 1000° C. in a more preferred embodiment with duration between 15 minutes to 3 hours. Not limited by the scientific hypothesis, the heating ramp rate can control the MOF micro-crystallite size which could determine the surface property and morphology of the catalyst after the thermal conversion.

Step III—Post Treatment

After the thermal conversion process in step II, the material can be processed through a post-treatment step to further improve the electrocatalytic activity. According to one embodiment of current invention, the post-treatment can be accomplished through acid washing. A variety of inorganic acids can be used to dissolve the excess amount metals in the material from Step II by simply immersing the thermally treated MOF material in the acid solution. The acid for this application include hydrochloric acid, sulfuric acid, nitrate acid, and other acid known to dissolve metals. The concentration of the acid can be in the range of 0.1 molar to undiluted concentration. In a preferred embodiment, the concentration of the acid ranges from 0.5 molar to 2 molar. The acid treatment temperature can range from the ambient to as high as 80° C. The acid treatment time ranges from 0.5 hour to 72 hours. According to another embodiment of the invention, the acid washed material can be further treated under elevated temperature in an inert gas flow or in a reducing gas flow under the similar temperature and carrier gas describe in Step II. Such second thermal treatment after acid washing can further improve the electrocatalytic activity. In yet another embodiment of the invention, the thermally treated MOF material from Step II can undergo another heat treatment under the environment of nitrogen-containing gas, such as ammonia, acetonitrile, etc. In a preferred embodiment, the treatment temperature should be between 400 to 1000° C. and the duration should be between 15 min to 3 hours. In a more preferred embodiment, the treatment temperature should be between 700 to 900° C. and the duration should be between 30 min to 2 hours.

The process of preparing electrocatalyst according to the embodiments of the current invention can be further elucidated by the following examples.

EXAMPLES

The following non-limiting examples are presented to illustrate the present invention and to assist one of ordinary skill in making and using the same. The examples are not intended in any way to otherwise limit the scope of the invention. As used herein, AB means A is inside of B.

Example 1

Figure 4:
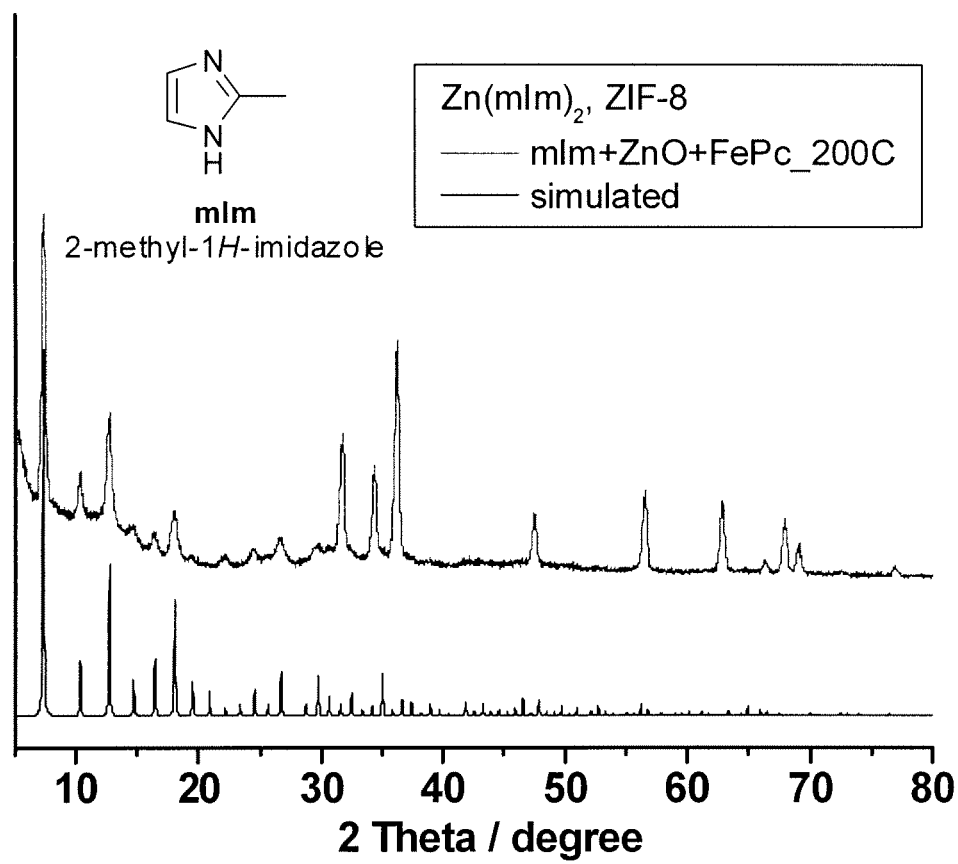
FIG. 4 is a plot showing the powder X-ray diffraction pattern of in-situ formed FePc ⊂ ZIF-8 versus that of simulated ZIF-8 pattern based on the crystal structure.

One-pot synthesis of FePc ⊂ ZIF-8-based electrocatalyst: A mixture of mIm (82.1 mg), ZnO (40.7 mg), and FePc (12.3 mg) was gently grinded using a pestle and mortar. The electrocatalyst was obtained by heating the mixture first at 200° C. under Ar for 24 hrs, then at 1050° C. under Ar for 1 hr, finally at 950° C. under $NH_3$ for 0.3 hr to give a black powder. The X-ray powder diffraction (XRD) taken for the crystallized FePc ⊂ ZIF-8 after 200° C. shows similar pattern to that of simulated ZIF-8, shown by FIG. 4.

Example 2

Figure 5:
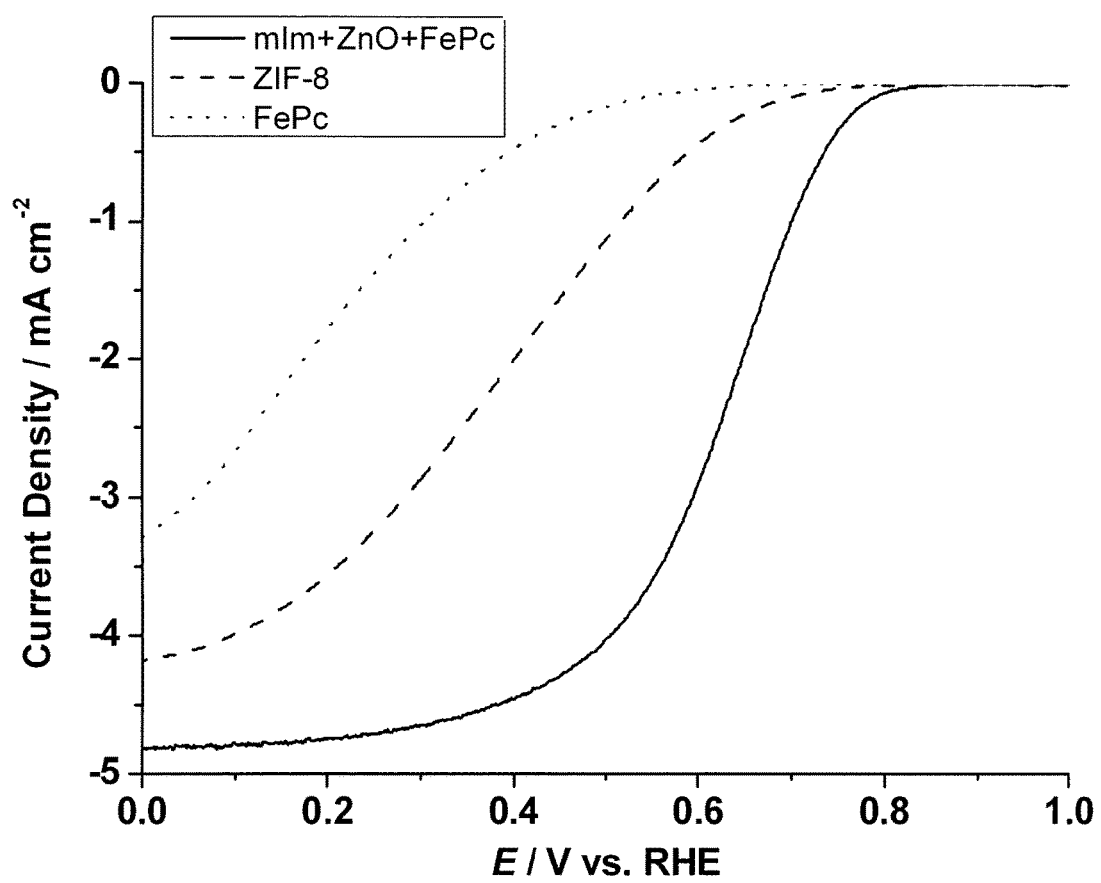
FIG. 5 is a plot showing the current density as a function of polarization potential measured by rotating ring disk electrode method for the sample prepared according to Example 1.
Figure 6:
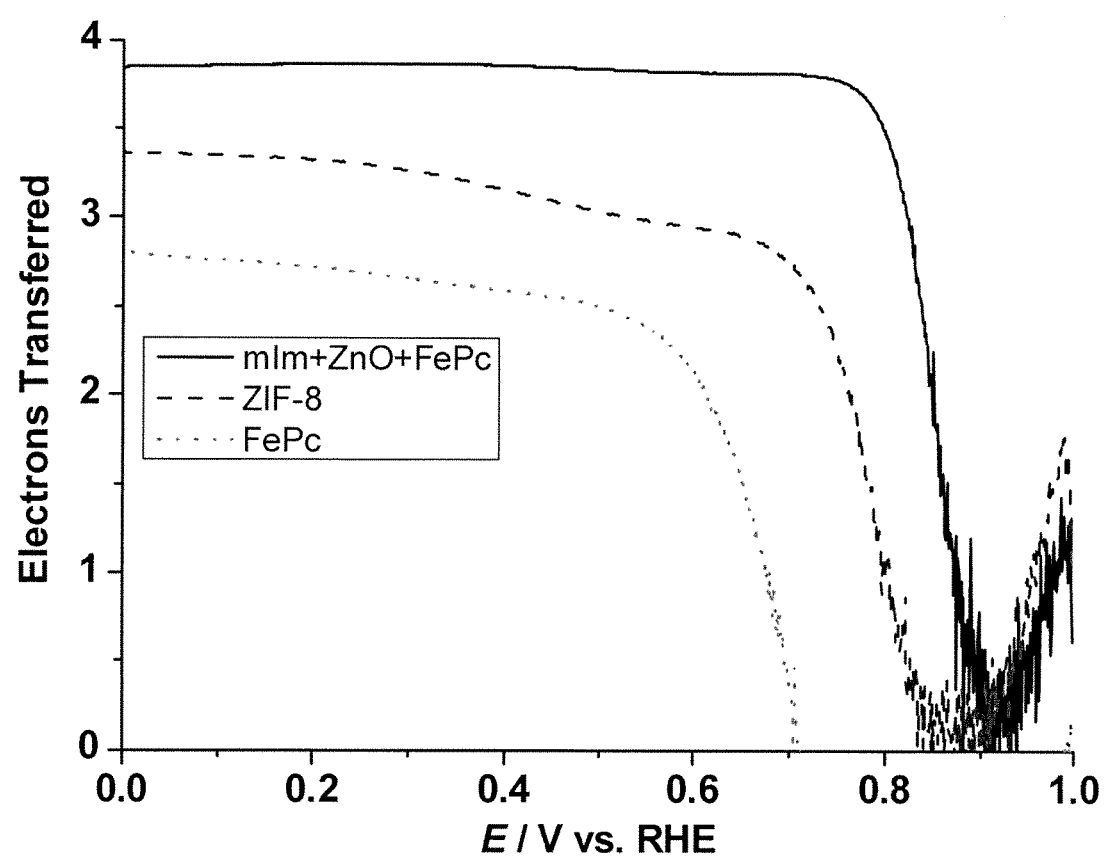
FIG. 6 is a plot showing the electron transfer number as a function of electrode potential measured for the sample prepared according to method in Example 1.
Figure 7:
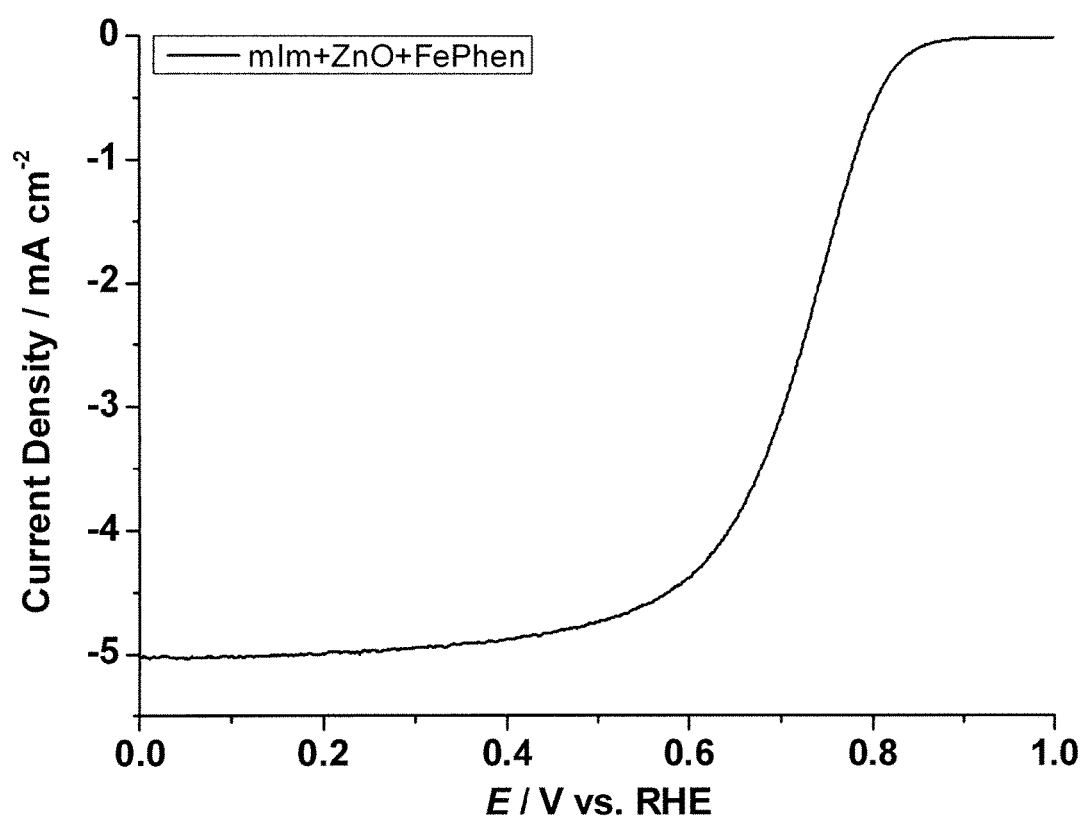
FIG. 7 is a plot of the current density as the function of polarization potential measured by rotating ring disk electrode method for the sample prepared according to Example 3.

The catalyst material prepared according to Example 1 was prepared into ink using 5% Nation solution and methanol as the solvents. The prepared ink was magnetic stirred for extended period of time until it becomes smooth and easy to deposit in a glassy carbon (GC) electrode. The thus prepared ink was used to test the electro-catalytic activity of the material using the rotating ring disk electrode (RRDE) technique. The ink was deposited on the GC electrode using a micropipette, targeting a weight per unit area of 600 μg/cm$_2$ of the dry sample. The catalyst ink is tested using 0.1 M $HClO_4$ or 0.5 M $H_2SO_4$ aqueous solution as the electrolyte, an $Hg/Hg_2SO_4$ reference electrode with a 0.5M $H_2SO_4$ solution and, a gold counter electrode. The electrolyte is purged with Argon gas for at least 30 minutes, and a voltammogram is recorded for background subtraction. A second voltammogram is recorded after the electrolyte is saturated with Oxygen gas for at least 30 minutes. FIG. 5 shows the current as the function of polarization potential for the sample in comparison with the sample prepared in an identical manner except that only commercial ZIF-8 or FePc was used during the heat treatment step. Similarly, FIG. 6 shows the comparison of the number of electron transfer at different potentials between the three samples. A significant enhancement of electrocatalytic activity toward ORR was observed.

Example 3

One-pot syntheses of FePhen ⊂ ZIF-8-based electrocatalyst: A mixture of mIm (82.1 mg), ZnO (40.7 mg), and FePhen (12.3 mg) was gently grinded using a pestle and mortar. The electrocatalyst was obtained by heating the mixture first at 200° C. under Ar for 24 hrs, then at 1050° C. under Ar for 1 hr, finally at 950° C. under $NH_3$ for 0.3 hr to give a black powder.

Example 4

The sample prepared according to Example 3 was tested following the same procedure described in Example 2. FIG.

Figure 8:
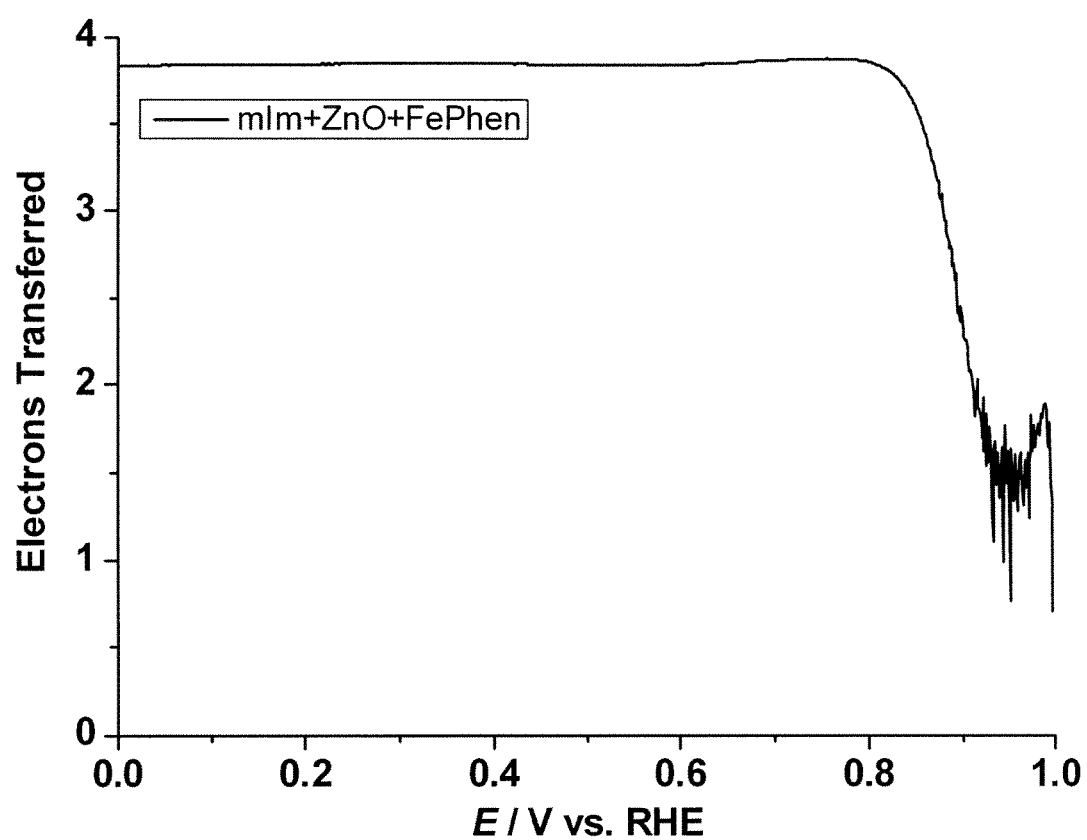
FIG. 8 is a plot of the electron transfer number as a function of electrode potential measured for the sample prepared according to method in Example 3.

7 shows the current as the function of polarization potential and FIG. 8 shows the number of electron transfer at different potentials for the sample measured by RRDE. A significant enhancement of electrocatalytic activity toward ORR was observed.

Example 5

One-pot syntheses of ferrocene⊂ZIF-8-based electrocatalyst: A mixture of mIm (451.6 mg), ZnO (203.5 mg), and ferrocene (46.5 mg) was gently grinded using a pestle and mortar. The electrocatalyst was obtained by heating the mixture first at 200° C. under Ar for 24 hrs, then at 1050° C. under Ar for 1 hr, finally at 950° C. under $NH_3$ for 0.3 hr to give a black powder.

Example 6

Figure 9:
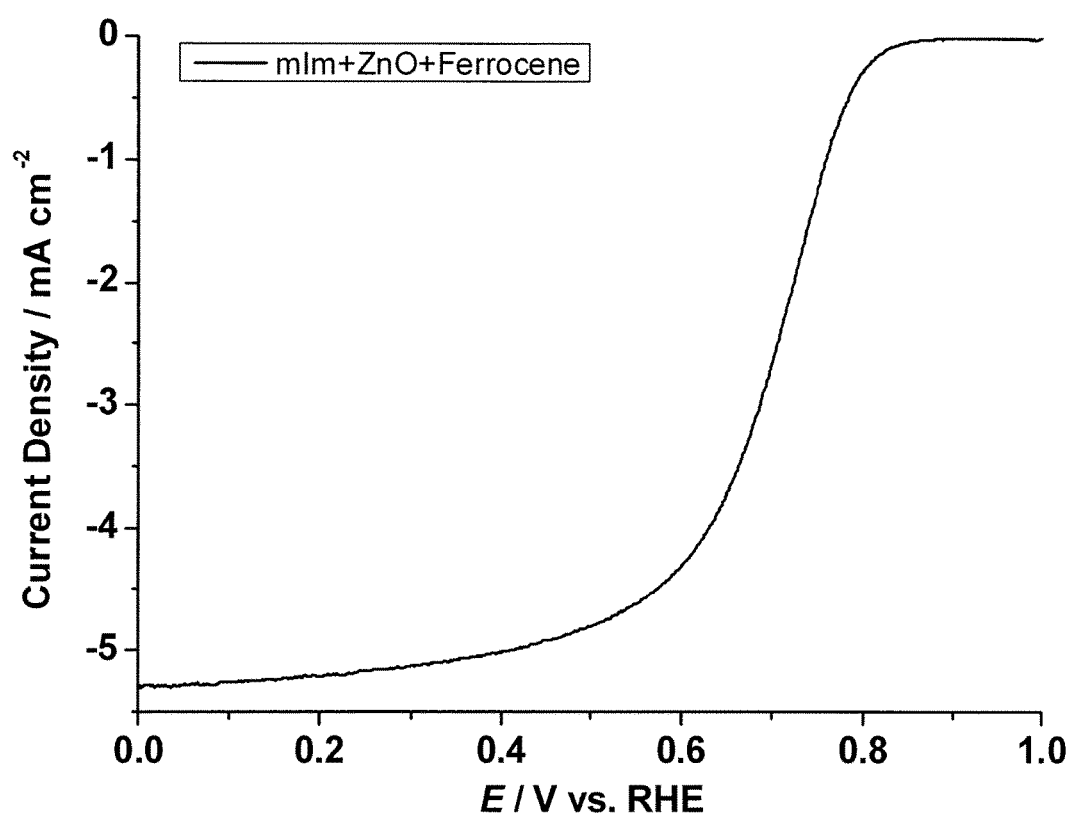
FIG. 9 is a plot of the density as a function of polarization potential measured by rotating ring disk electrode method for the sample prepared according to Example 5.
Figure 10:
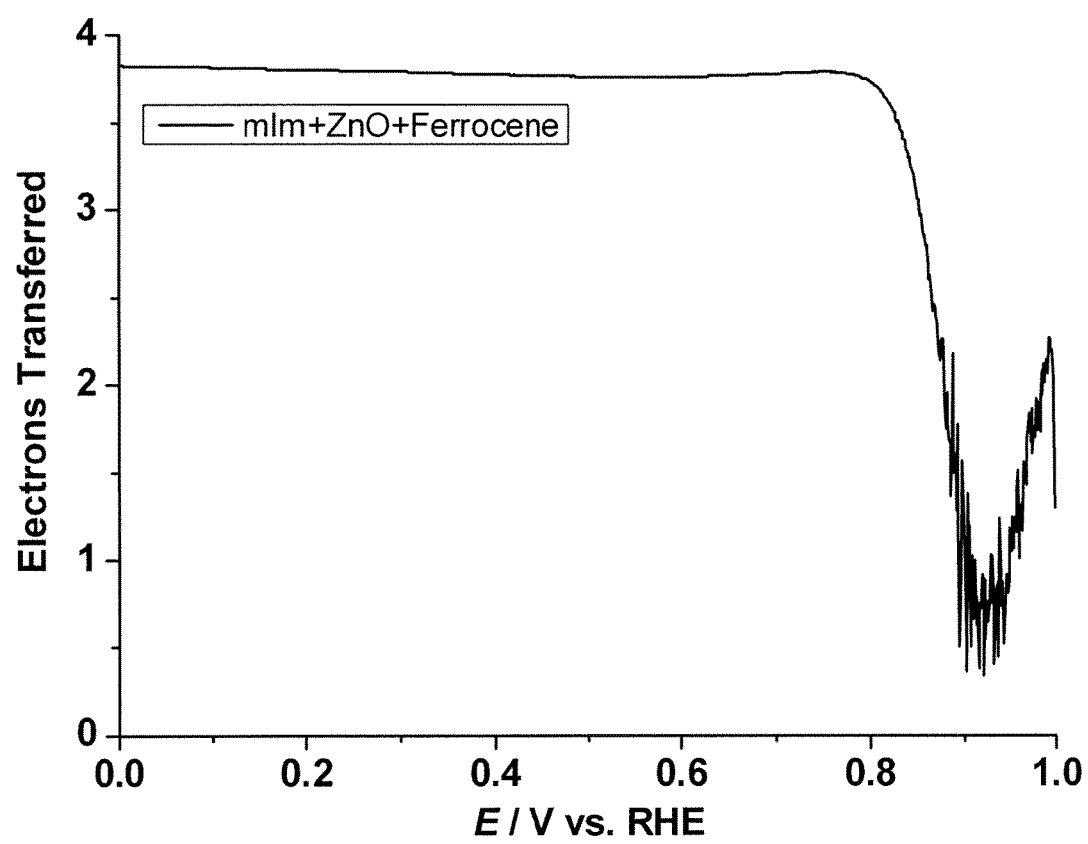
FIG. 10 is a plot of the electron transfer number as a function of electrode potential measured for the sample prepared according to method in Example 5.

The sample prepared according to Example 5 was tested following the same procedure described in Example 2. FIG. 9 shows the current as the function of polarization potential and FIG. 10 shows the number of electron transfer at different potentials for the sample measured by RRDE. A significant enhancement of electrocatalytic activity toward ORR was observed.

Example 7

Figure 11:
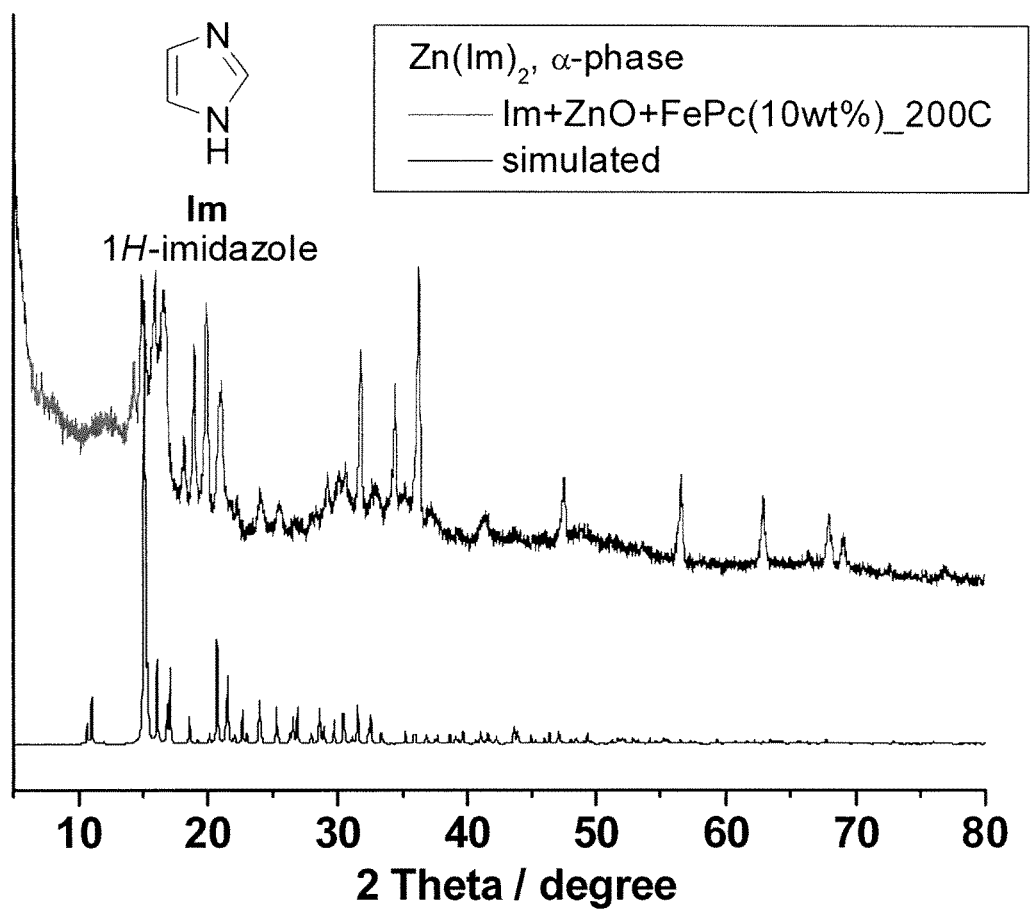
FIG. 11 is a plot of the powder X-ray diffraction pattern of in-situ formed FePc ⊂ Zn(Im)$_2$ versus that of simulated Zn(Im)$_2$ (α-phase) pattern based on the crystal structure.

One-pot syntheses of FePc⊂Zn(Im)$_2$-based electrocatalyst: A mixture of Im (68.1 mg), ZnO (40.7 mg), and FePc (10.9 mg) was gently grinded using a pestle and mortar. The electrocatalyst was obtained by heating the mixture first at 200° C. under Ar for 24 hrs, then at 1050° C. under Ar for 1 hr, finally at 950° C. under $NH_3$ for 0.3 hr to give a black powder. The X-ray powder diffraction (XRD) taken for the crystallized FePc⊂Zn(Im)$_2$ after 200° C. shows similar pattern to that of simulated Zn(Im)$_2$, shown by FIG. 11.

Example 8

Figure 12:
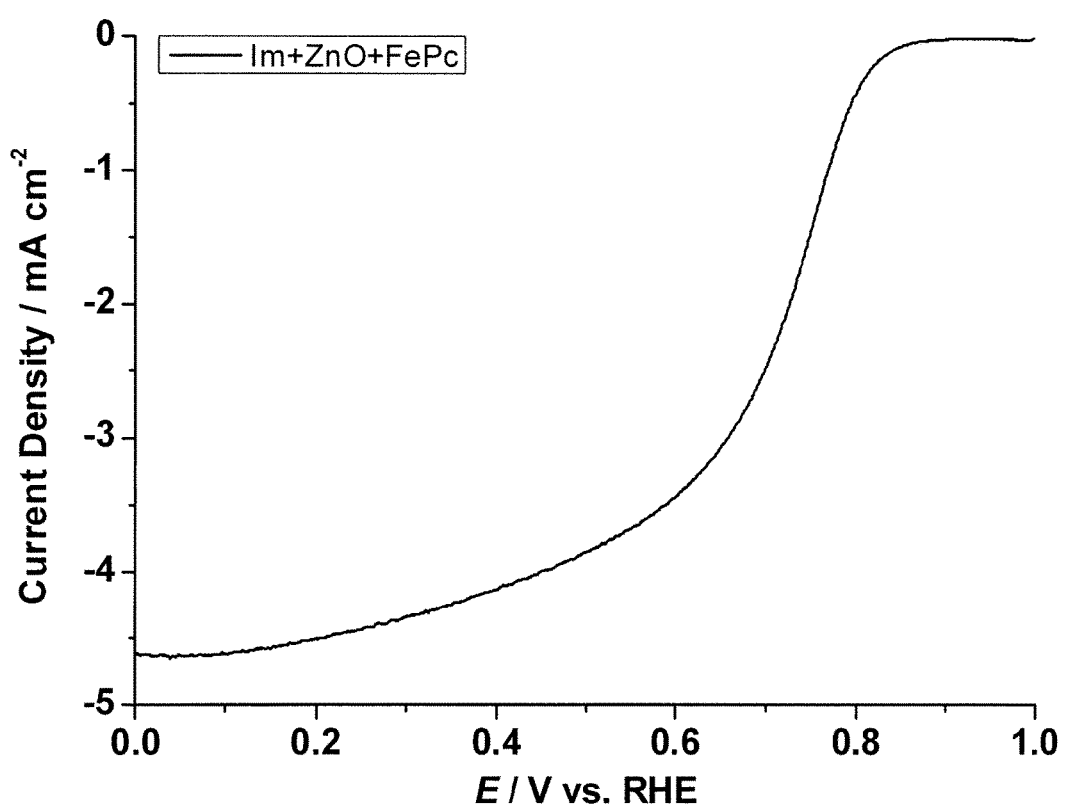
FIG. 12 is a plot of current density as a function of polarization potential measured by rotating ring disk electrode method for the sample prepared according to Example 7.
Figure 13:
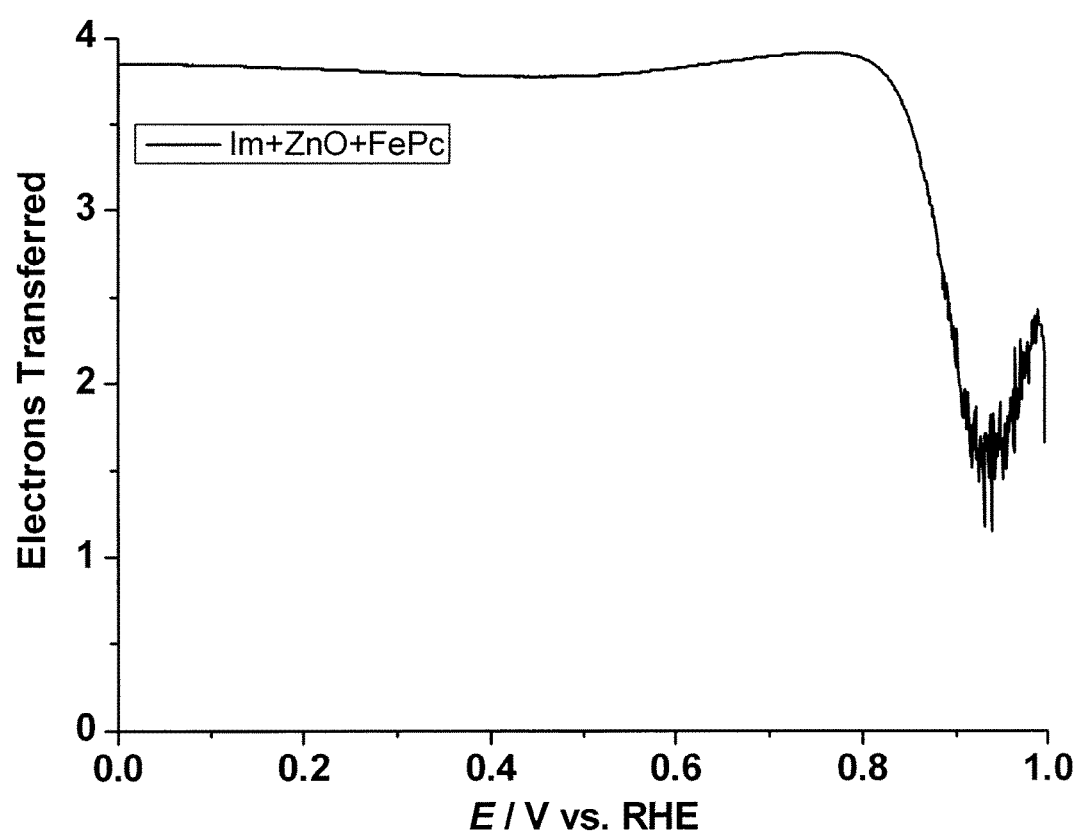
FIG. 13 is a plot of the electron transfer number as a function of electrode potential measured for the sample prepared according to method in Example 7.

The sample prepared according to Example 7 was tested following the same procedure described in Example 2. FIG. 12 shows the current as the function of polarization potential and FIG. 13 shows the number of electron transfer at different potentials for the sample measured by RRDE. A significant enhancement of electrocatalytic activity toward ORR was observed.

Example 9

Figure 14:
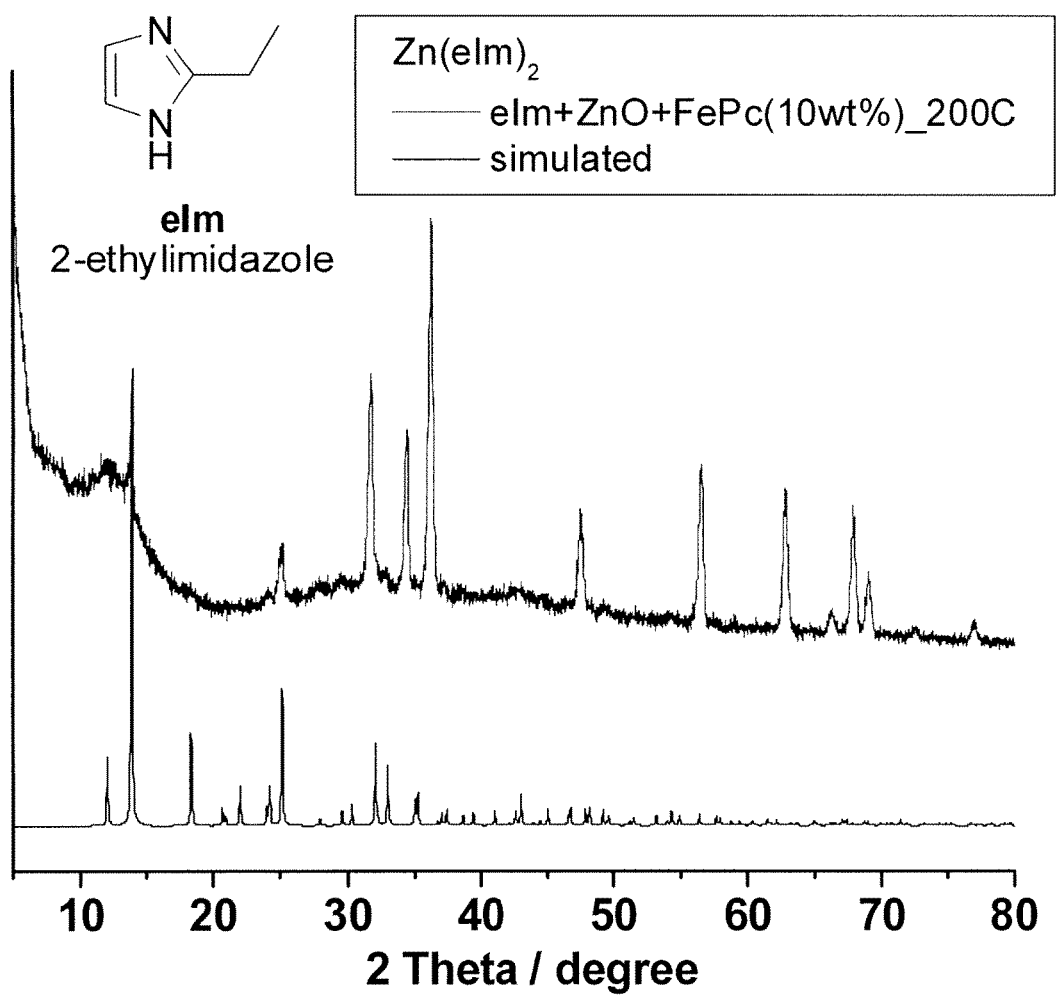
FIG. 14 is a plot of the powder X-ray diffraction pattern of in-situ formed FePc ⊂ Zn(eIm)$_2$ versus that of simulated Zn(eIm)$_2$ pattern based on the crystal structure.

One-pot syntheses of FePc⊂Zn(eIm)$_2$-based electrocatalyst: A mixture of eIm (96.2 mg), ZnO (40.7 mg), and FePc (13.7 mg) was gently grinded using a pestle and mortar. The electrocatalyst was obtained by heating the mixture first at 200° C. under Ar for 24 hrs, then at 1050° C. under Ar for 1 hr, finally at 950° C. under $NH_3$ for 0.3 hr to give a black powder. The X-ray powder diffraction (XRD) taken for the crystallized FePc⊂Zn(eIm)$_2$ after 200° C. shows similar pattern to that of simulated Zn(eIm)$_2$, shown by FIG. 14.

Example 10

Figure 15:
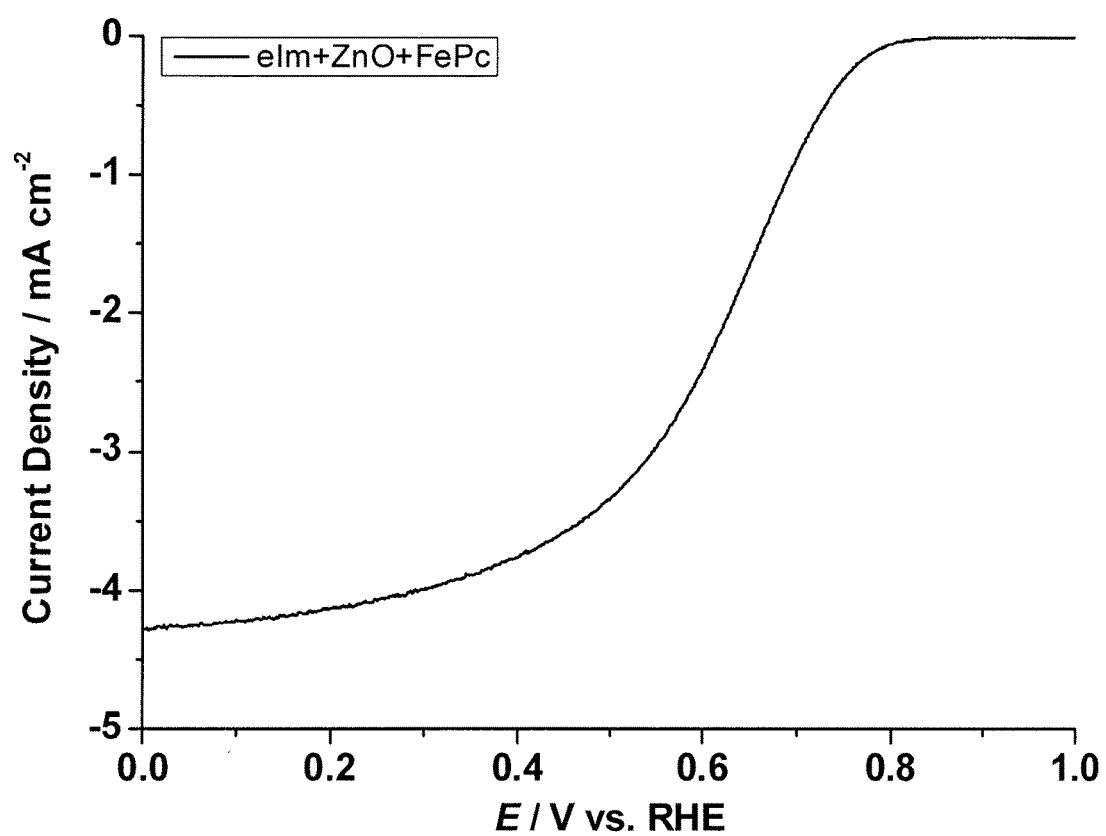
FIG. 15 is a plot of current density as a function of polarization potential measured by rotating ring disk electrode method for the sample prepared according to Example 9.
Figure 16:
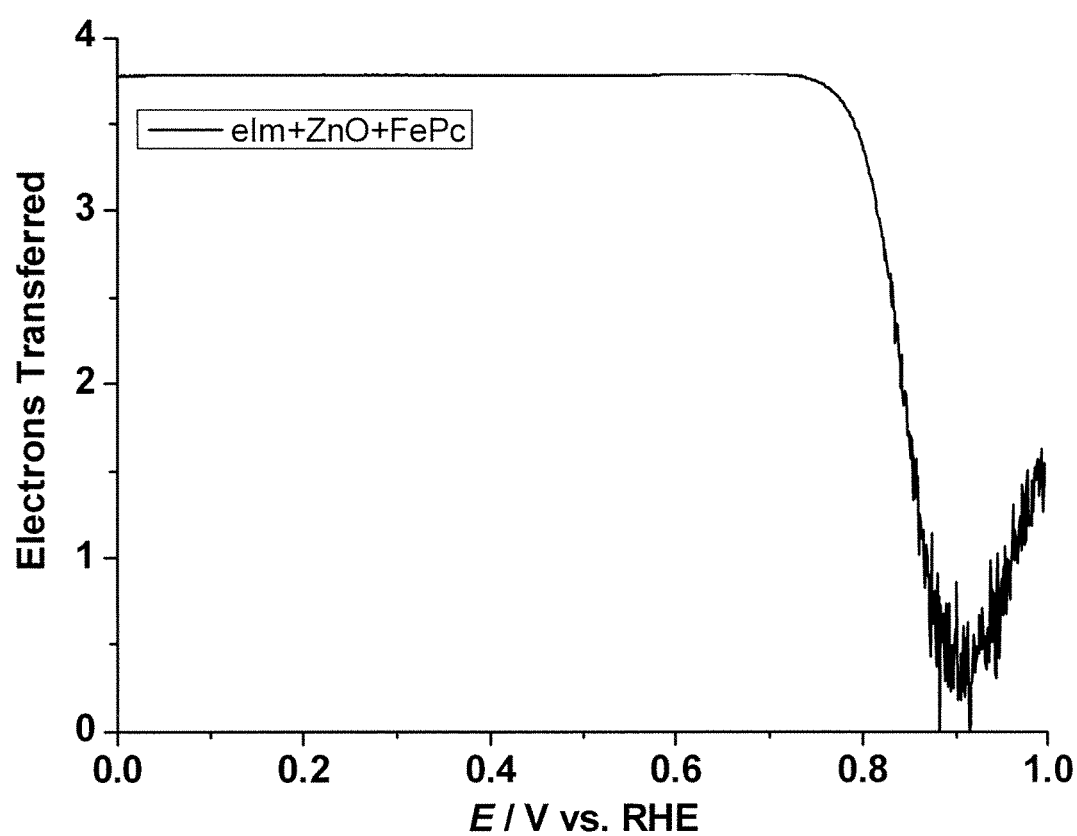
FIG. 16 is a plot of the number of electron transfer as a function of electrode potential measured for the sample prepared according to method in Example 9.

The sample prepared according to Example 9 was tested following the same procedure described in Example 2. FIG. 15 shows the current as the function of polarization potential and FIG. 16 shows the number of electron transfer at different potentials for the sample measured by RRDE. A significant enhancement of electrocatalytic activity toward ORR was observed.

Example 11

Figure 17:
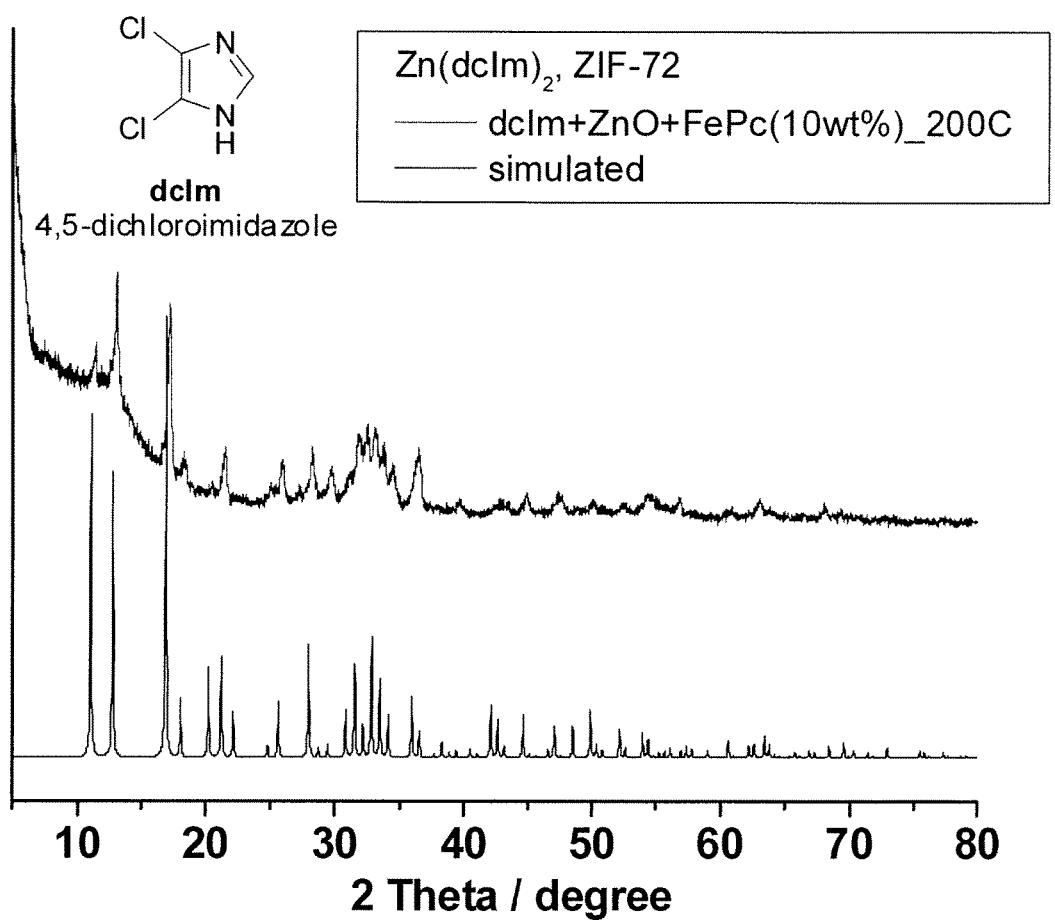
FIG. 17 is a plot of the powder X-ray diffraction pattern of in-situ formed FePc ⊂ ZIF-72 versus that of simulated ZIF-72 pattern based on the crystal structure.

One-pot syntheses of FePc⊂ZIF-72-based electrocatalyst: A mixture of dcIm (137.0 mg), ZnO (40.7 mg), and FePc (17.8 mg) was gently grinded using a pestle and mortar. The electrocatalyst was obtained by heating the mixture first at 200° C. under Ar for 24 hrs, then at 1050° C. under Ar for 1 hr, finally at 950° C. under $NH_3$ for 0.3 hr to give a black powder. The X-ray powder diffraction (XRD) taken for the crystallized FePc⊂ZIF-72 after 200° C. shows similar pattern to that of simulated ZIF-72, shown by FIG. 17.

Example 12

Figure 18:
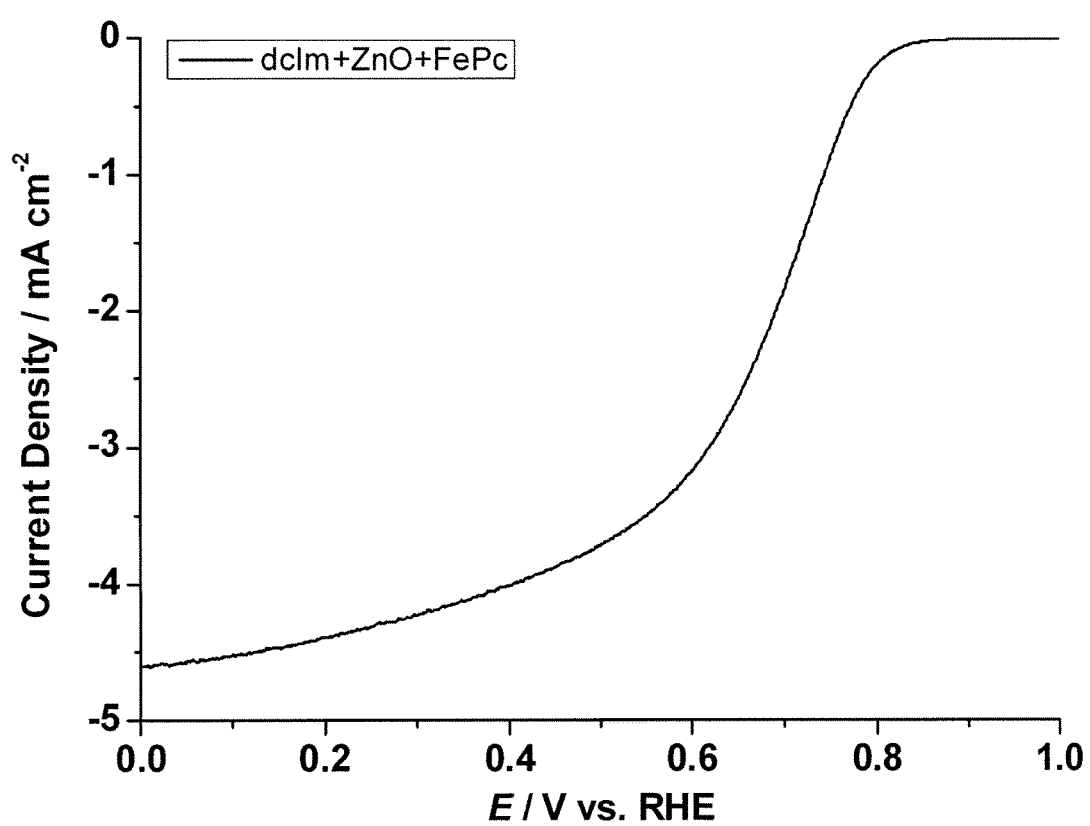
FIG. 18 is a plot of current density as a function of polarization potential measured by rotating ring disk electrode method for the sample prepared according to Example 11.
Figure 19:
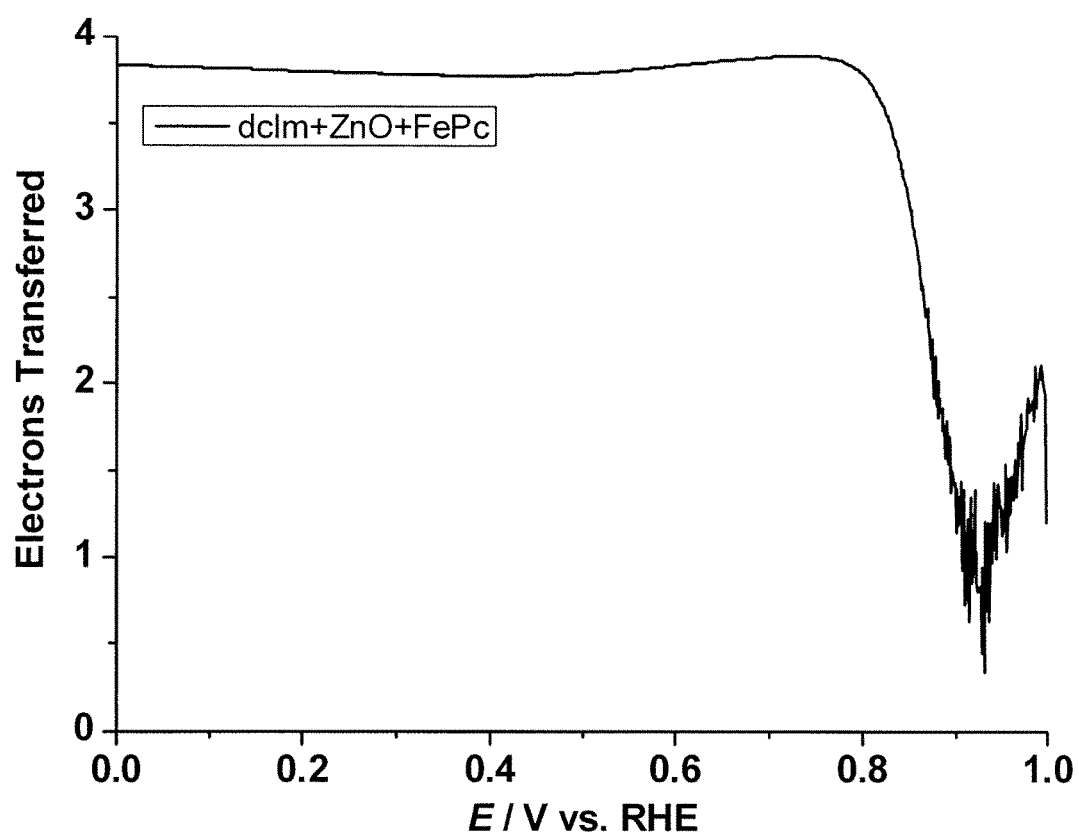
FIG. 19 is a plot of electron transfer number as a function of electrode potential measured for the sample prepared according to method in Example 11.

The sample prepared according to Example 11 was tested following the same procedure described in Example 2. FIG. 18 shows the current as the function of polarization potential and FIG. 19 shows the number of electron transfer at different potentials for the sample measured by RRDE. A significant enhancement of electrocatalytic activity toward ORR was observed.

Example 13

Figure 20:
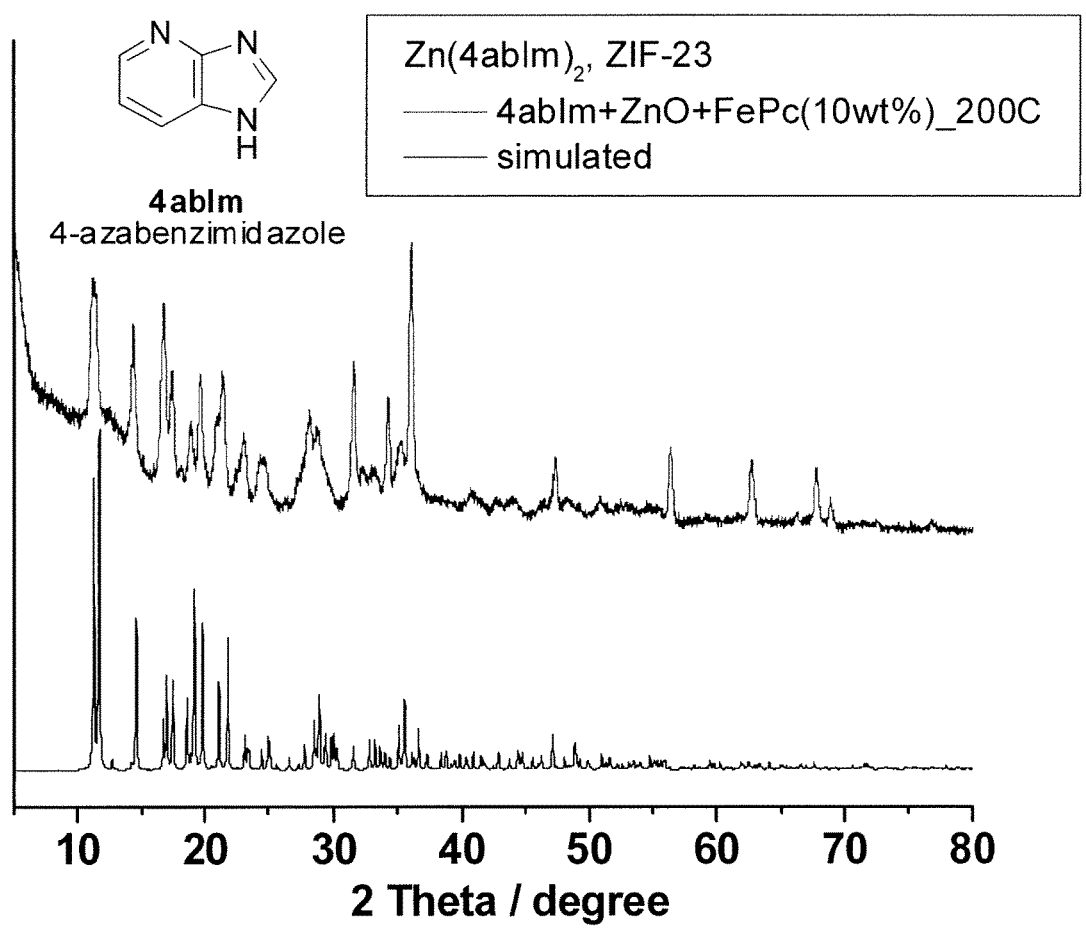
FIG. 20 is a plot of the powder X-ray diffraction pattern of in-situ formed FePc ⊂ ZIF-23 versus that of simulated ZIF-23 pattern based on the crystal structure.

One-pot syntheses of FePc⊂ZIF-23-based electrocatalyst: A mixture of 4abIm (119.2 mg), ZnO (40.7 mg), and FePc (16.0 mg) was gently grinded using a pestle and mortar. The electrocatalyst was obtained by heating the mixture first at 200° C. under Ar for 24 hrs, then at 1050° C. under Ar for 1 hr, finally at 950° C. under $NH_3$ for 0.3 hr to give a black powder. The X-ray powder diffraction (XRD) taken for the crystallized FePc⊂ZIF-23 after 200° C. shows similar pattern to that of simulated ZIF-23, shown by FIG. 20.

Example 14

Figure 21:
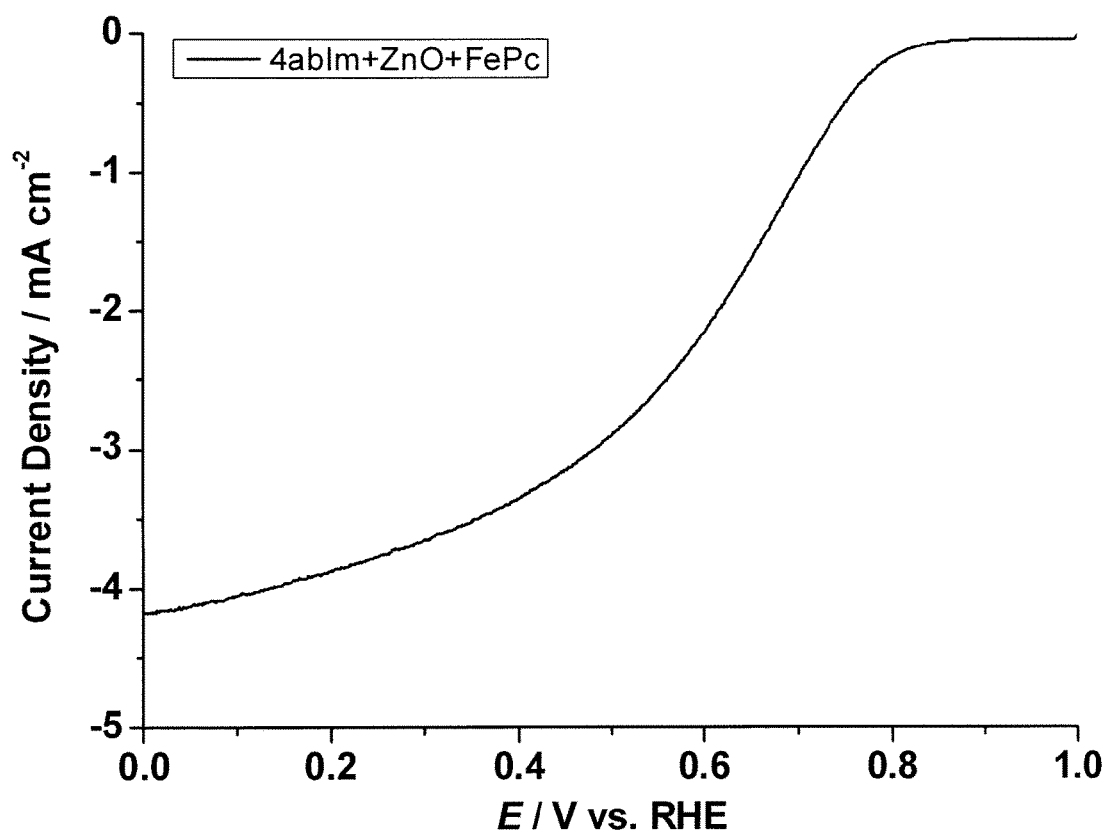
FIG. 21 is a plot of current density as a function of polarization potential measured by rotating ring disk electrode method for the sample prepared according to Example 13.
Figure 22:
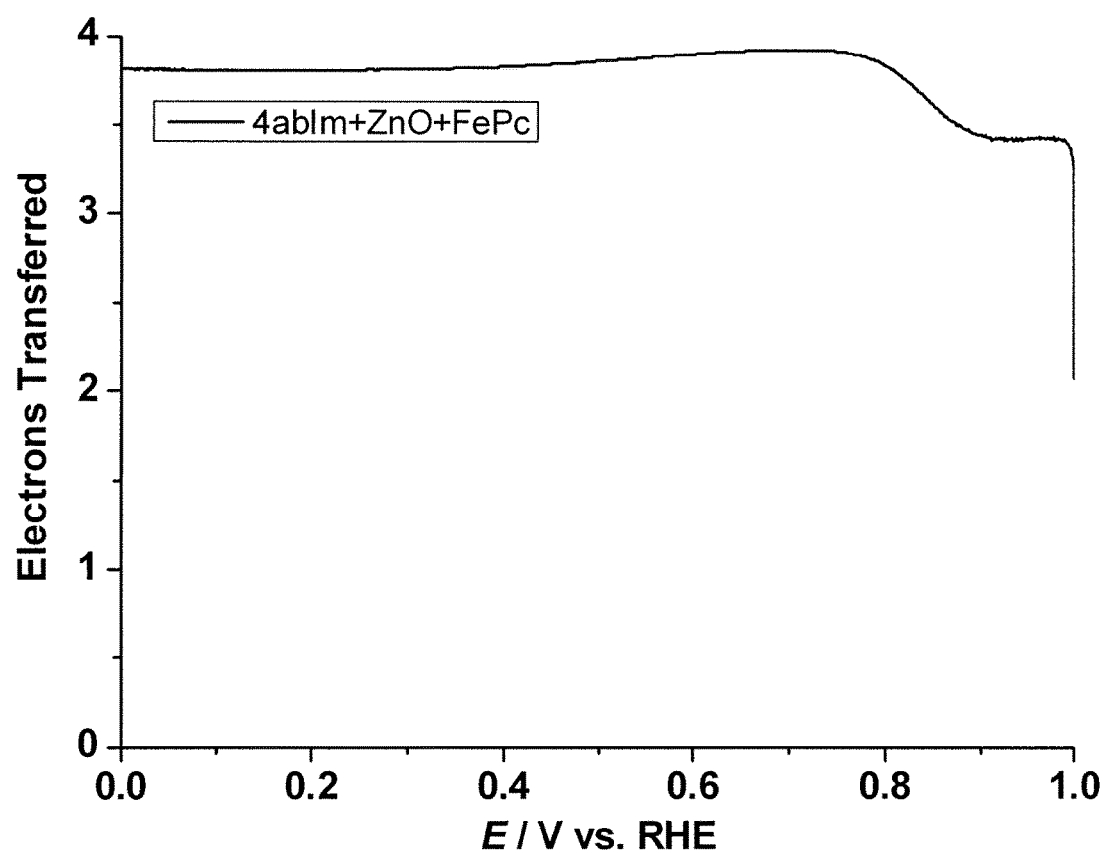
FIG. 22 is a plot of the electron transfer number as a function of electrode potential measured for the sample prepared according to method in Example 13.

The sample prepared according to Example 13 was tested following the same procedure described in Example 2. FIG. 21 shows the current as the function of polarization potential and FIG. 22 shows the number of electron transfer at different potentials for the sample measured by RRDE. A significant enhancement of electrocatalytic activity toward ORR was observed.

Example 15

One-pot syntheses of FePhen⊂Zn(Im)$_2$-based electrocatalyst: A mixture of Im (68.1 mg), ZnO (40.7 mg), and FePhen (5.4 mg) was gently grinded using a pestle and mortar. The electrocatalyst was obtained by directly heating the mixture at 1050° C. under Ar for 1 hr, then at 950° C. under $NH_3$ for 0.3 hr to give a black powder.

Example 16

Figure 23:
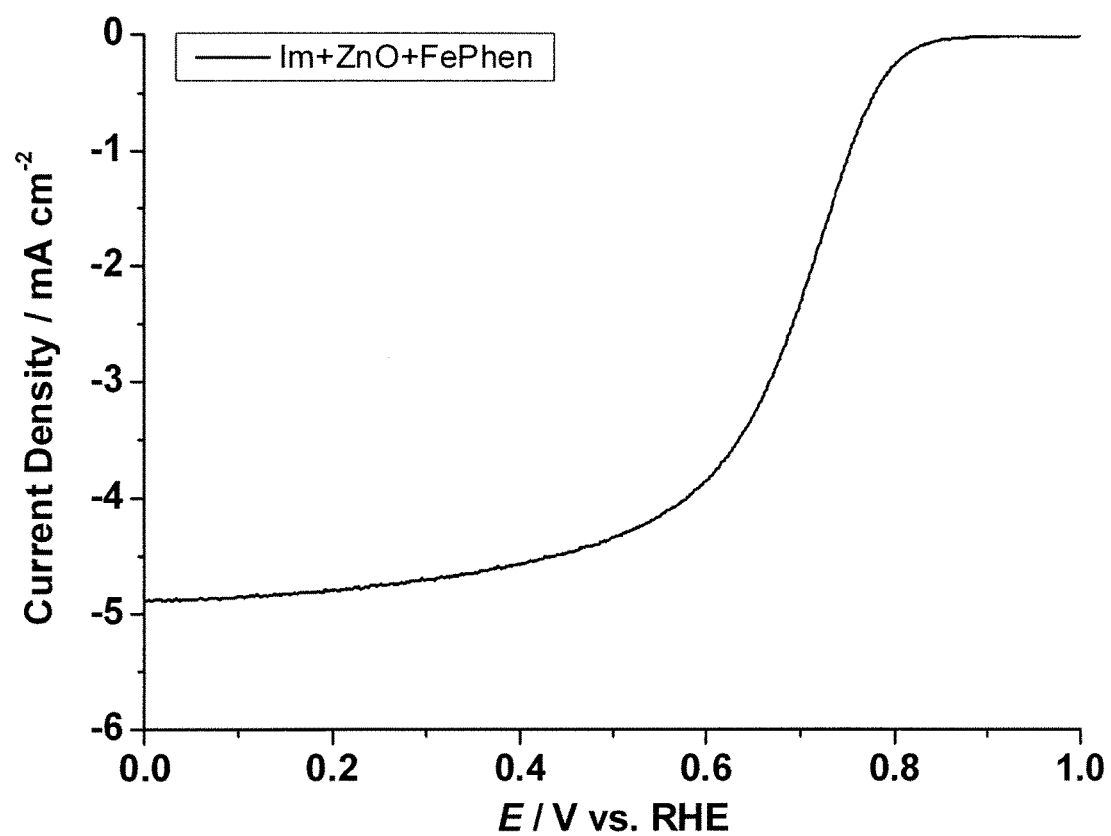
FIG. 23 is a plot of current density as a function of polarization potential measured by rotating ring disk electrode method for the sample prepared according to Example 15.
Figure 24:
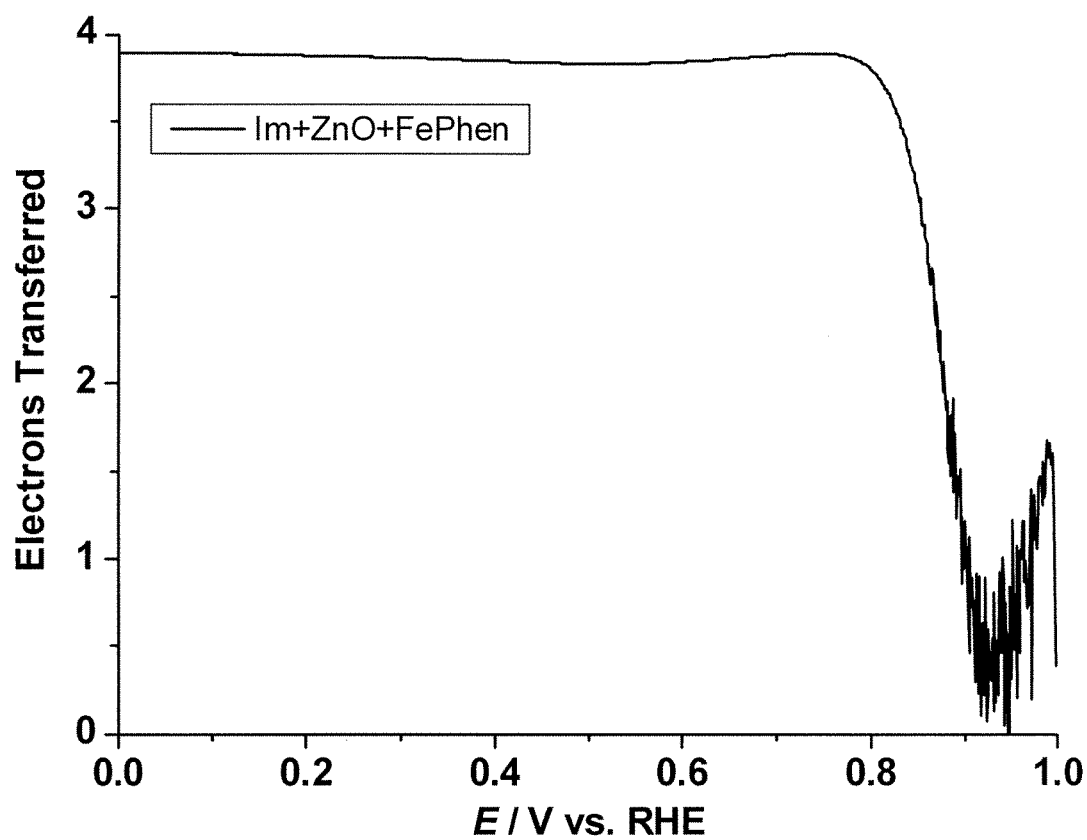
FIG. 24 is a plot of electron transfer number as the function of electrode potential measured for the sample prepared according to method in Example 15.

The sample prepared according to Example 15 was tested following the same procedure described in Example 2. FIG. 23 shows the current as the function of polarization potential and FIG. 24 shows the number of electron transfer at different potentials for the sample measured by RRDE. A significant enhancement of electrocatalytic activity toward ORR was observed.

Example 17

One-pot syntheses of FePhen⊂ZIF-8-based electrocatalyst: A mixture of mIm (82.1 mg), ZnO (40.7 mg), and FePhen (6.1 mg) was gently grinded using a pestle and mortar. The electrocatalyst was obtained by directly heating the mixture at 1050° C. under Ar for 1 hr, then at 950° C. under $NH_3$ for 0.3 hr to give a black powder.

Example 18

Figure 25:
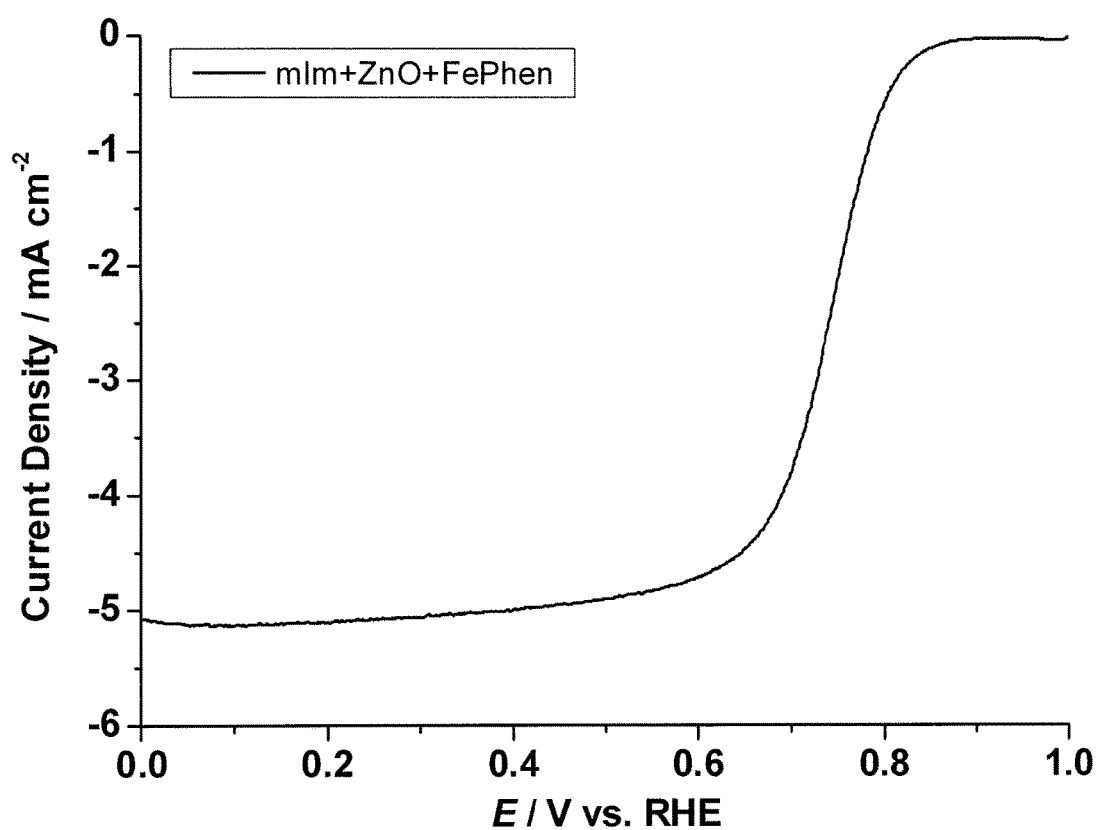
FIG. 25 is a plot of current density as a function of polarization potential measured by rotating ring disk electrode method for the sample prepared according to Example 17.
Figure 26:
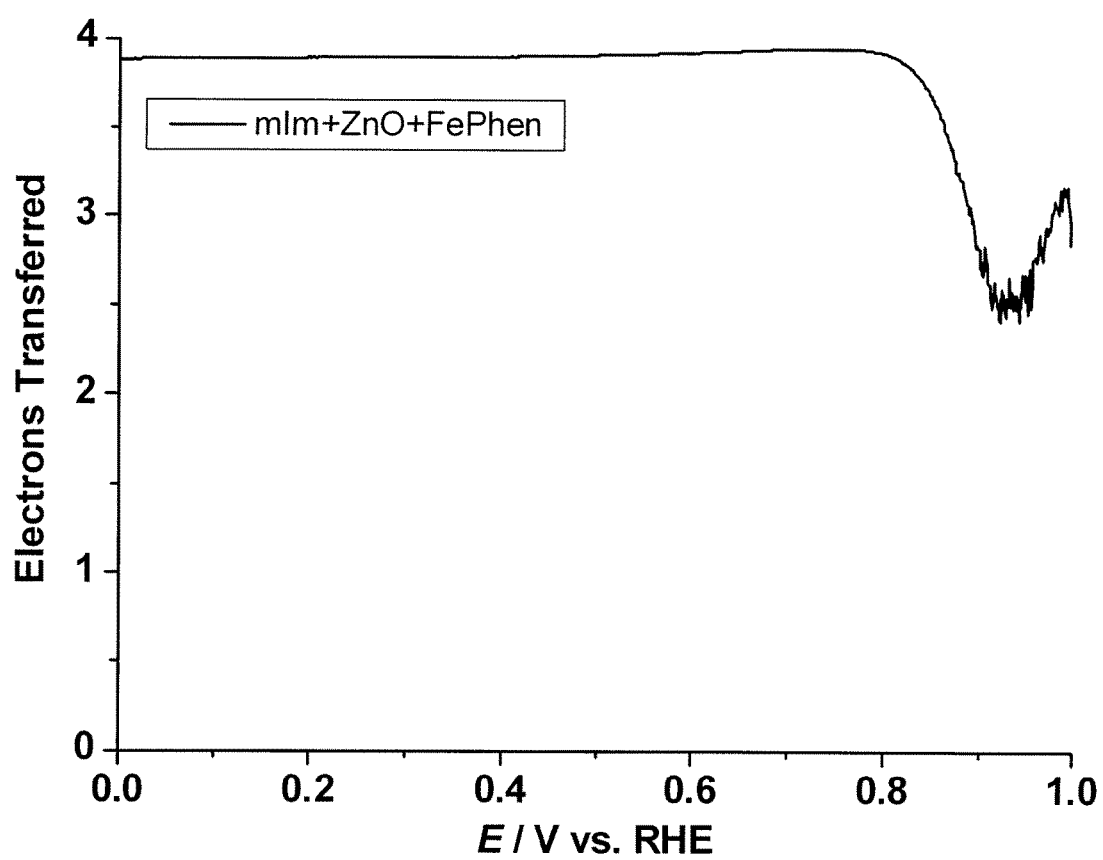
FIG. 26 is a plot of electron transfer number as a function of electrode potential measured for the sample prepared according to method in Example 17.

The sample prepared according to Example 17 was tested following the same procedure described in Example 2. FIG. 25 shows the current as the function of polarization potential and FIG. 26 shows the number of electron transfer at different potentials for the sample measured by RRDE. A significant enhancement of electrocatalytic activity toward ORR was observed.

The foregoing description of embodiments of the present invention have been presented for purposes of illustration and description. It is not intended to be exhaustive or to limit the present invention to the precise form disclosed, and modification and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A method of synthesis of a non-platinum group metal (PGM) catalyst for use in an oxygen reduction reaction (ORR) process, said method comprising the steps of
combining at least one organic ligand, a secondary building unit, and at least one transition metal compound into a solid mixture;
heating the solid mixture to a temperature and for a duration sufficient to form a metal-organic framework (MOF) through a solid-state reaction; and
forming MOF crystallites;
wherein the step of combining takes place in a single vessel.

2. The method of claim 1, further comprising the step of converting the MOF to an electro-catalyst via pyrolysis at high temperature.

3. The method of claim 1, wherein the method does not comprise the step of separating the MOF from the other reaction components.

4. The method of claim 1, wherein the at least one transition metal is incorporated into the MOF either as part of the framework or as a uniformly distributed additive during the synthesis.

5. The method of claim 1, wherein the MOF contains at least two different transition metals.

6. The method of claim 5, wherein the step of combining comprises mixing a first transition metal salt or metal oxide with the organic ligand in a desired stoichiometrical ratio for the formation of the MOF, and adding a second transition metal salt or complex.

7. The method of claim 5, wherein the step of adding the at least two different transition metals are followed by the step of uniformly mixing the solid mixture through mechanical means prior to subjecting the solid mixture to heat treatment.

8. The method of claim 2, wherein the solid-state reaction step and the pyrolysis step are performed in tandem without a step of cooling in between the solid-state reaction step and the pyrolysis step.

9. The method of claim 1, wherein the at least one organic ligand comprises a plurality of nitrogen containing ligands selected from the group consisting of: imidazolate, pyrazolate, piperazine, tetrazolate, and combinations thereof.

10. The method of claim 5, wherein the first transition metal is in the zinc salt or zinc oxide form.

11. The method of claim 5, wherein the second transition metal is selected from the group consisting of the salt or organometallic complex form of iron, cobalt, copper, or nickel.

12. The method of claim 1, further comprising the step of processing the heat-treated MOF to further enhance catalytic activity, said processing comprising:
immersing the catalytic MOF in an acid solution;
applying a second heat treatment in a nitrogen containing environment at a second heat treatment temperature between 700° C. and 900° C. for a second heat treatment duration between 30 minutes and 2 hours.

13. The method of claim 2 further comprising incorporating the electro-catalyst into a membrane electrode assembly of a proton exchange membrane fuel cell.

14. A method of synthesis of a non-platinum group metal (PGM) catalyst for use in an oxygen reduction reaction (ORR) process, said method comprising the steps of
combining at least one organic ligand, a secondary building unit, and at least one transition metal compound into a solid mixture solvent-free;
continuously heating the solid mixture at a ramp rate;
during the continuous heating, prior to a carbonization temperature, forming metal organic framework microcrystals;
holding the solid mixture at a dwell temperature above the carbonization temperature for a dwell duration sufficient to convert the organic ligand into a carbonaceous material forming a catalytic metal-organic framework (MOF) through a solid-state reaction.

15. The method of claim 14, wherein the ramp rate is between 1° C./min and 50° C./min.

16. The method of claim 15, wherein the ramp rate is between 5° C./min and 20° C./min.

17. The method of claim 15, wherein the dwell temperature is between 700° C. and 1000° C.

18. The method of claim 17, wherein the dwell duration is between 15 minutes and 3 hours.

19. The method of claim 18, further comprising applying an acid wash treatment comprising:
immersing the catalytic MOF in an acid solution;
applying a second heat treatment in an ammonia containing environment at a second heat treatment temperature for a second heat treatment duration.

20. The method of claim 19, wherein the second heat treatment temperature is between 700° C. and 900° C. and the second heat treatment duration is between 30 minutes and 2 hours.

21. The method of claim 5, wherein the step of combining comprises mixing a first transition metal salt or metal oxide and a second transition metal salt or complex with the organic ligand in a desired stoichiometrical ratio for the formation of the MOF containing both first transition metal and second transition metal in the framework of the MOF.

* * * * *